United States Patent [19]

Malladi

[11] Patent Number: 5,638,518

[45] Date of Patent: Jun. 10, 1997

[54] NODE LOOP CORE FOR IMPLEMENTING TRANSMISSION PROTOCOL IN FIBRE CHANNEL

[75] Inventor: Srinivasa R. Malladi, Santa Clara, Calif.

[73] Assignee: LSI Logic Corporation, Milpitas, Calif.

[21] Appl. No.: 327,748

[22] Filed: Oct. 24, 1994

[51] Int. Cl.$^6$ .................................................. G06F 9/00
[52] U.S. Cl. .............................. 395/200.21; 395/200.17
[58] Field of Search ...................... 395/200.21, 200.17, 395/850, 886; 359/161, 110

[56] References Cited

U.S. PATENT DOCUMENTS

| | | | |
|---|---|---|---|
| 5,519,526 | 5/1996 | Chua et al. | 359/152 |
| 5,530,842 | 6/1996 | Abraham et al. | 395/500 |
| 5,535,035 | 7/1996 | DeFoster et al. | 359/161 |

OTHER PUBLICATIONS

Fibre Channel: Connection to the Future, Fibre Channel Assoc., 1994, Chapters 1–3, pp. 1–20.
Fibre Channel—Physical and Signaling Interface (FC–PH), Rev. 4.1, Working Draft Proposed American National Standard for Information Systems, Aug. 12, 1993, pp. i–28.
Fibre Channel—Arbitrated Loop (FC–AL), Rev. 4.2, Working Draft Proposal American National Standard for Information Systems, Mar. 11, 1994, pp. i–8.

*Primary Examiner*—Mehmet B. Geckil
*Attorney, Agent, or Firm*—Townsend and Townsend and Crew LLP; Henry K. Woodward

[57] ABSTRACT

Disclosed is a node loop port core for use in a Fibre Channel high speed data system for implementing transmission protocol and loop arbitration. The node loop core converts incoming data from 10 bit format to 8 bit format, checks frame CRC, parses frames, and steers the results to any one of a number of buffers. The buffers function as loading areas for incoming frames and are not part of NL core. In transmit operation, the node loop core chooses a loaded buffer to service, assembles frames, generates and adds CRC to frames, encodes the result from 8 bit to 10 bit format and then transfers the results. All control functions associated with primitive signals and sequences are handled by the node loop core. The core follows established Fibre Channel arbitration rules and recognizes all necessary primitive signals and primitive sequences for proper operation of the arbitrated loop.

6 Claims, 18 Drawing Sheets

1. SOF encoded, if FIF is chosen
2. Header words
3. Optional Header words, this field may have 16 to 64 bytes
4. Payload data, can be 0–2112 bytes
5. CRC
6. EOF encoded, if FIF chosen 1. SOF encoded, if FIF is chosen
2. Header words
3. Optional Header words, this field may have 16 to 64 bytes
4. Payload data, can be 0–2112 bytes
5. CRC
6. EOF encoded, if FIF chosen

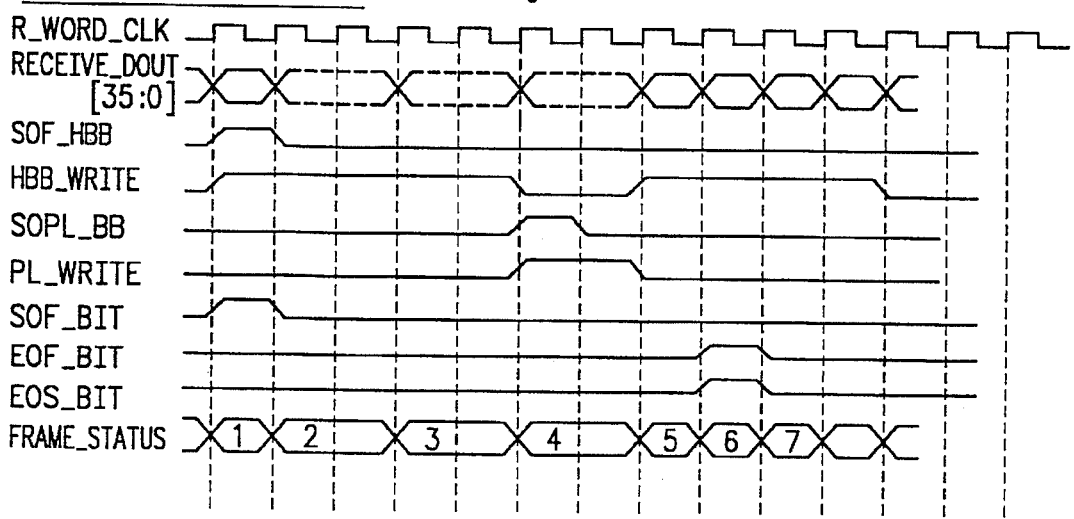

1. SOF encoded
2. Header words
3. Optional Header words, this field may have 16 to 64 bytes
4. Payload data, can be 0-2112 bytes
5. CRC
6. Base Address for this frame, if offset is used
7. Frame length, EOF encoded, and frame_status

*FIG. 11C*

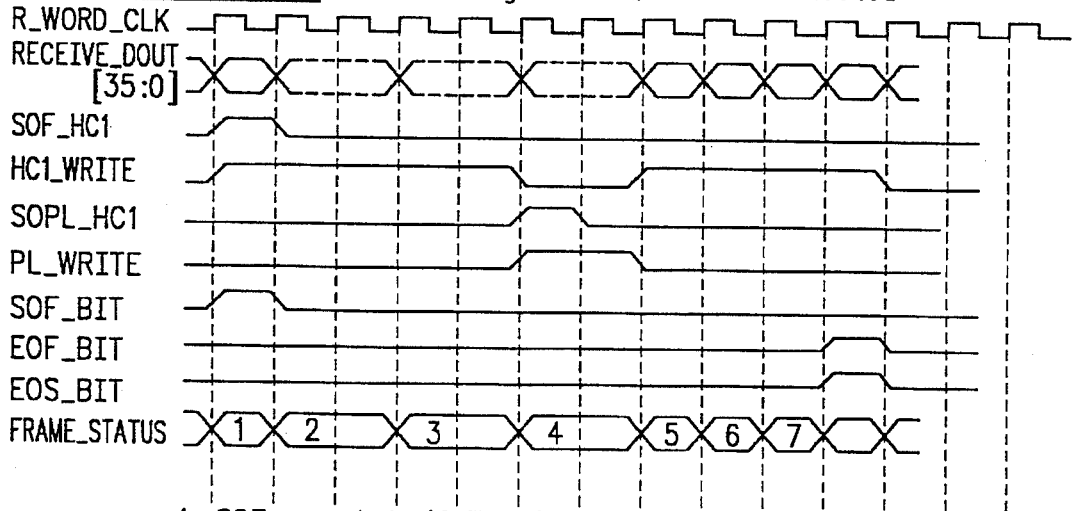

1. SOF encoded, if FIF is chosen
2. Header words
3. Optional Header words, this field may have 16 to 64 bytes
4. Payload data, can be 0-2112 bytes
5. CRC
6. Base Address for this frame, if offset is used
7. Frame length, EOF encoded, and frame_status

*FIG. 11D*

1. SOF transmission
2. Hardware prepared header transmission
3. Payload transmission
4. CRC transmission
5. EOF transmission
6. Six idles transmission Note:
1. Labelled R_R in port algorithms.
2. Labelled C_C in port algorithms.

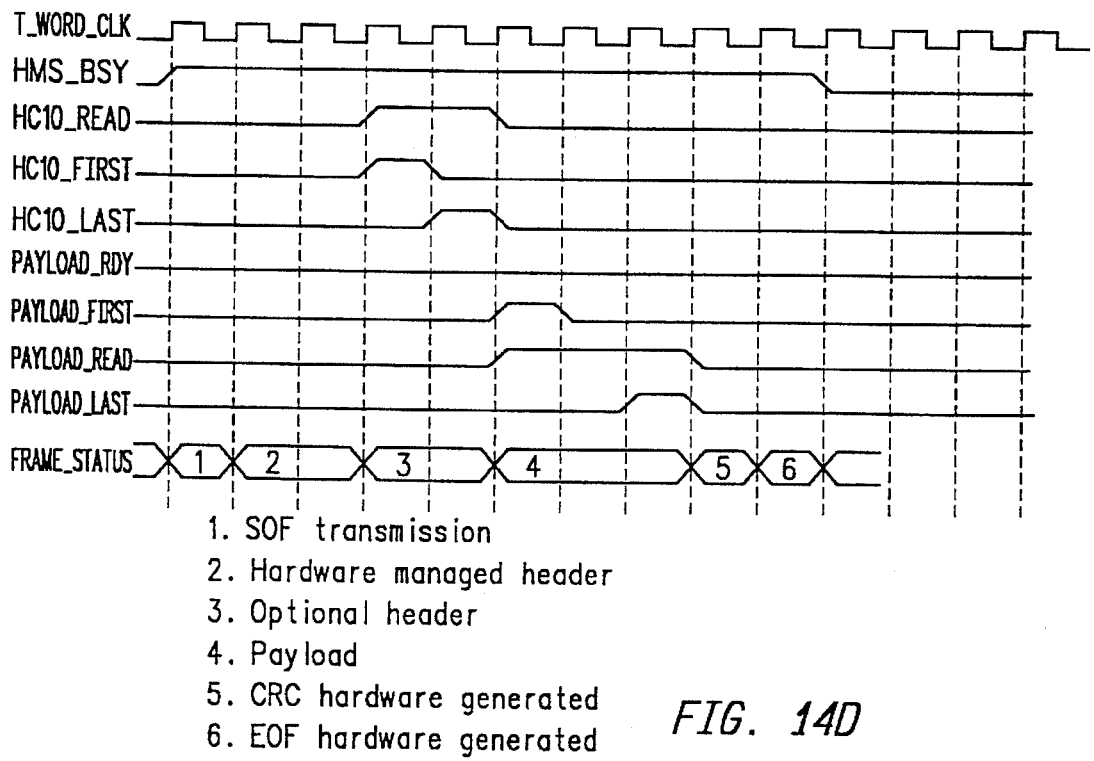

1. SOF transmission
2. Hardware managed header
3. Optional header
4. Payload
5. CRC hardware generated
6. EOF hardware generated

FIG. 14D

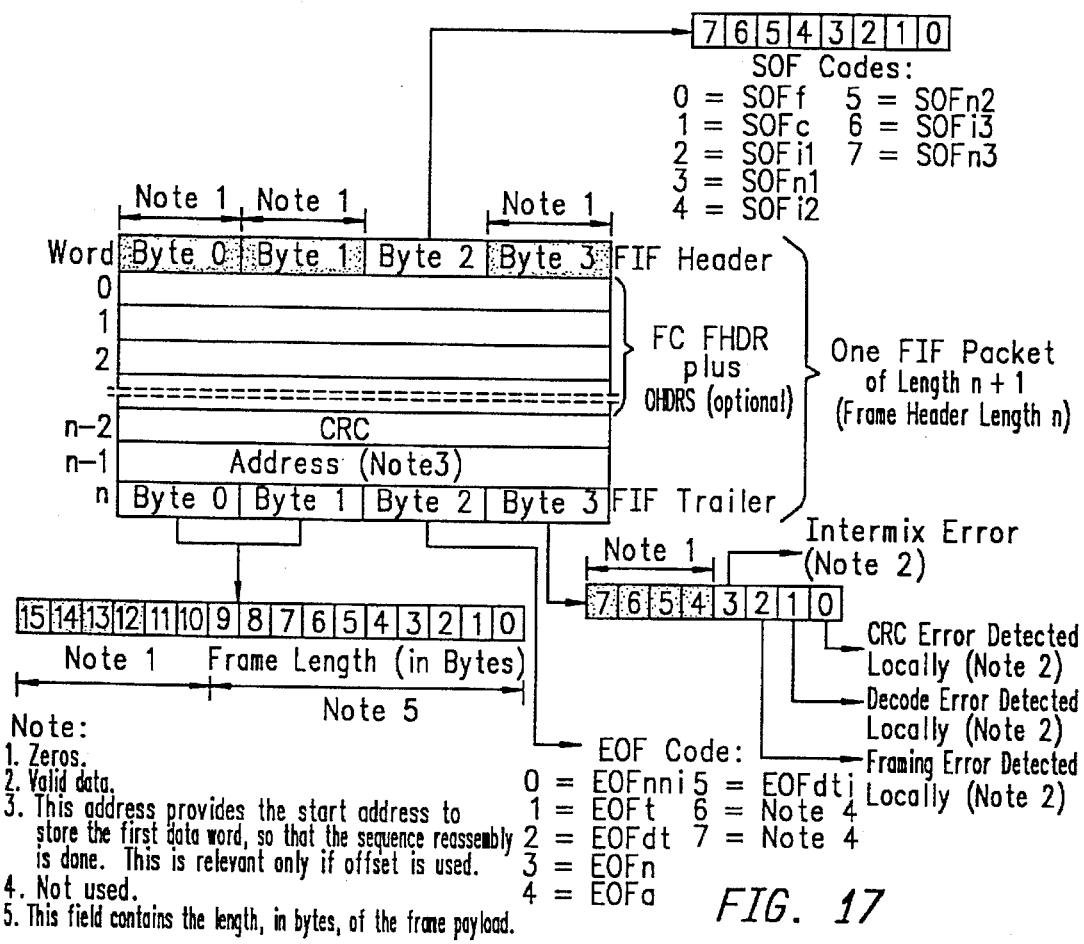

SOF Codes:
0 = SOFf   5 = SOFn2
1 = SOFc   6 = SOFi3
2 = SOFi1  7 = SOFn3
3 = SOFn1
4 = SOFi2

EOF Code:
0 = EOFnni  5 = EOFdti
1 = EOFt    6 = Note 4
2 = EOFdt   7 = Note 4
3 = EOFn
4 = EOFa Note:
1. Zeros.
2. Valid data.
3. This address provides the start address to store the first data word, so that the sequence reassembly is done. This is relevant only if offset is used.
4. Not used.
5. This field contains the length, in bytes, of the frame payload.

FIG. 17

NODE LOOP CORE FOR IMPLEMENTING TRANSMISSION PROTOCOL IN FIBRE CHANNEL

CROSS-REFERENCE TO RELATED APPLICATION

This patent application is related to application Ser. No. 08/329,032, filed Oct. 24, 1994, now U.s. Pat. No. 5,598,541, filed concurrently herewith for NODE LOOP PORT SUPER CORE FOR USE IN FIBRE CHANNEL.

BACKGROUND OF THE INVENTION

This invention relates generally to data communication and processing, and more particularly the invention relates to a Node Loop Core for implementing the transmission protocol in a Fibre Channel Node Port and which is flexible in structure and in operation with a Node Loop Port Super Core for implementing the Fibre Channel Standard as adopted by ANSI.

The Fibre Channel Standard (FCS) as adopted by ANSI provides a low cost, high speed interconnect standard for workstations, mass storage devices, printers, and displays. The Fibre Channel (FC) is ideal for distributed system architectures and image intensive LANs and clusters. FC is media independent and provides multi-vendor interoperability.

Current FC transfer rates exceed 100 Mbytes per second in each direction. FC data transfer rates can also be scaled to 50, 25, and 12.5 Mbytes per second. The aggregate bandwidth is unlimited.

Fibre Channel technology provides a single interface that supports both channel and network connections for both switched and shared mediums. FC simplifies device interconnections and software, and reduces hardware costs since each device needs only a single FC port for both channel and network interfaces. Network, point to point, and peripheral interfaces can be accessed through the same hardware connection with the transfer of data of any format for the sending device buffer to the receiving device buffer.

FCS can also be implemented using a low-cost Arbitrated Loop configuration. The aggregate bandwidth is limited by the FC maximum bandwidth, but this is the best configuration for controlling disk arrays. The Node Loop Port (NL_Port) provides the necessary functions for Arbitrated Loop.

FIGS. 1A–1D illustrate several topologies for implementing the Fibre Channel.

FIG. 1A illustrates a Point-to-Point topology. FIG. 1B shows a simple fabric topology. FIG. 1C shows a Closed Arbitrated Loop, and FIG. 1D illustrates an Open Arbitrated Loop. The fabric link in FIG. 1D uses circuit switching much like a telephone network. The FC creates multiple, temporary, direct connections that each provide full bandwidth. Further, the bandwidth can be expanded by adding more paths.

A Fibre Channel Fabric can be as simple as a single cable connecting two devices or as complex as a large number of FC switches incorporating both circuit and packet switching that connect up to 16,000,000 devices. A device attached to an FC fabric can transmit data to any other device and receive data from any other device attached to the fabric.

An FC fabric uses circuit switching much like a telephone network. The FC creates multiple, temporary, direct connections that each provide the full bandwidth. Each connection can use the entire bandwidth so it does not become congested by adding more workstations and peripherals. The bandwidth can be expanded by adding more paths.

The FC hardware routes the transmissions. A device connected to the fabric that wants to transmit requests connection to the receiving device. The FC attempts to route the call by querying the availability of the receiving device. If the device responds that it is available, the FC confirms the route back to the sending device. If the connection fails, the FC re-routes the transmission.

Setting up frequent connections is not time intensive (less than 10 μs per connection).

Every Node Port logs in with the port to which it is attached, either an F_Port or an N_Port.

The Fibre Channel Standard includes bridges and routers that can simultaneously transport other data communications protocols, so already existing devices need only be enhanced by attaching adapters rather than being replaced. The FCS provides for new media technologies to be easily added. Currently the FCS provides interconnection to the following higher-level protocols:

FDDI (Fibre Distributed Data Interface)

HIPPI (High Performance Parallel Interface)

SCSI (Small Computer Systems Interface)

IPI (Intelligent Peripheral Interface)

IBM's Block Multiplexer Channel

ATM (In process)

FC is a solution to the following applications that require large volume information storage and transfers:

Medical Imaging

Engineering CAD

Scientific Visualization

Computer Generated 3D Animation and Full-motion Video

Simulation

Multimedia

Video Conferencing

Image-based Document Storage and retrieval

Large Transaction Databases

Off-site Large Volume Backups—decouples mass storage from CPU—simple, quick, offsite backup Communications Channels for Supercomputer Emulation (workstation clustering)

These applications require data transfers up to Mbits per second (30 32-bit color 1024×768 pixel images per second) uncompressed. Most of the current connection technologies are unable to transfer data fast enough to meet these needs. Fibre Channel can transfer uncompressed video data at rates that can generate full-screen real-time color displays.

The following tables define the Fibre Channel Standard (FCS levels (layers).

| FC Level | Description | Defines: |
|---|---|---|
| FC-0 | Physical Interface | Optical and electrical parameters for interfacing to a variety of physical media that operate over a wide range of data rates |
| FC-1 | Transmission Protocol | Serial encoding, decoding, and error control (8-bit/10-bit code) |
| FC-2 | Signaling (Framing) Protocol | Frame structures and byte sequences used by FC-4 to transfer data (transport mechanism) |
| FC-3 | Common Services | a set of services that are common across multiple N_Ports of an FC node |
| FC-4 | Mapping to | Software mapping between the FC |

| FC Level | Description | Defines: |
|---|---|---|
| | Upper-Level Protocols | lower levels (FC-0,1,2,3) and the upper-level protocols (IP13, SCSI, IP etc.) |

Following are brief definitions of some of the FCS Framing Protocol (FC-2) terminology.

Two possible FC frame formats with FC frames being separated from each other by at least six four-byte IDLEs.

Following are illustrations of two Fibre Channel frames with a table defining the frame fields:

| SOF | FHDR | Payload | | CRC | EOF |
|---|---|---|---|---|---|
| | | or | | | |
| SOF | FHDR | OHDR | Payload | CRC | EOF |

| Mnemonic | Definition | Size (Bytes |
|---|---|---|
| SOF | Start of Frame | 4 |
| FHDR | Frame Header | 24 |
| OHDR | Optional Headers | 64 or 0 |
| Payload | Data | 2112 or 2048 |
| CRC | Frame Error Check | 4 |
| EOF | End of Frame | 4 |

Each frame is an indivisible unit of information used by the signaling protocol (FC-2) and there are four major FC-2 frame types:

Device_Data frames carry data of the upper level protocol type.

Link_Data frames which carry a built-in protocol called Link Services.

Link_Control frames which implement flow control, error detection, and error handling functions.

Video_Data frames which carry video data that is directed to a video buffer.

The following table shows the FC-2 Frame Header (FHDR) structure:

| Word | Byte 1 | Byte 2 | Byte 3 | Byte 4 |
|---|---|---|---|---|
| 1 | R_CTL | DESTINATION_ID | | |
| 2 | Reserved | SOURCE_ID | | |
| 3 | TYPE | F_CTL | | |
| 4 | SEQ_ID | DF_CTL | | SEQ_CNT |
| 5 | OX_ID | | RX_ID | |
| 6 | PARAMETER | | | |

The following table defines the FHDR R_CTL routing bits.

| R_CTL[7:4] | Frame Definition |
|---|---|
| 0000 | FC-4 Device_Data |
| 0010 | Extended Link_Data |
| 0011 | FC-4 Link_Data |
| 0100 | Video_Data |
| 1000 | Basic Link_Data |
| 1100 | Link_Control |
| All Others | Reserved |

FIG. 2 is a functional block diagram of the NL Core 10 and the Super Core 12 which implement the FC-1 and FC-2 transmission and signalling protocols of the Fibre Channel standard. Heretofore, these protocols have been implemented with application specific integrated circuits (ASIC) with a host computer. This structure requires large and complex logic and has proved to be limited in achieving the 80 Mbytes/sec sustained throughput required.

The present invention provides a Node Loop Core for use in a modular super core structure with an imbedded processor which supports a full-featured Fibre Channel operation at 80 Mbytes/second sustained throughput. The structure can be designed in an application specific integrated circuit with custom specific functions appended thereto.

SUMMARY OF THE INVENTION

The Node Loop Core in accordance with the invention includes a Decode Word unit and an Encode_Word unit for interfacing with the Fibre Channel Cable, an Arbitrated Loop, and Receive and Transmit Units for interfacing with the Super Core for the transmission of data to and from the Fibre Channel Cable and attached apparatus.

The Decode Word unit functions to convert 10-bit data to 8-bit data with error checking, recognize a comma character, and to construct parity protected words from half-words or bytes.

The Encode_Word unit functions to convert 8-bit data to 10-bit encoded data and generate the comma character for use with transmitted data. The unit also checks parity error of input words and divides the words into half-words or bytes as programmed.

The Arbitrated Loop performs initialization protocol and arbitration functions while recognizing all primitive signals and sequences pertinent to the loop.

The Receive Unit performs frame parsing and frame steering, error checking, primitive detection, and offset computation if offset is used.

The Transmit Unit provides frame construction from multiple sources, CRC generation, and primitive signal and sequence generation. The unit also implements hardware managed sequences and provides the mechanism for software managed single frame.

The Node Loop Port Core, in accordance with the invention, functions with the Super Core in supporting an Arbitrated Loop topology in attaching multiple communicating ports in a loop without hubs and switches and provides maximum possible data transfer bandwidth at the speeds of 100, 50, 25, and 12.5 Mbits/second.

The invention and objects and features there of will be more readily apparent from the following detailed description and appended claims when taken with the drawing.

BRIEF DESCRIPTION OF THE DRAWINGS

FIGS. 11A–11D are timing diagrams for reception of a class 1 frame, reception of class 2/3 receive frame, reception of a class 2/3 data frame, and reception of a class 1 data frame, respectively.

FIGS. 14A–14D are timing diagrams for transmission of a single data frame, transmission of a link frame, transmission of back-to-back frames for a hardware managed sequence with optional headers present, and for transmission of a frame in a hardware managed sequence when an optional header is not present, respectively.

FIG. 17 illustrates a receive frame interface format (FIF).

DETAILED DESCRIPTION OF ILLUSTRATIVE EMBODIMENT

Figure 1A:
FIGS. 1A–1D are functional block diagrams illustrating topologies of the Fibre Channel.
Figure 1B:
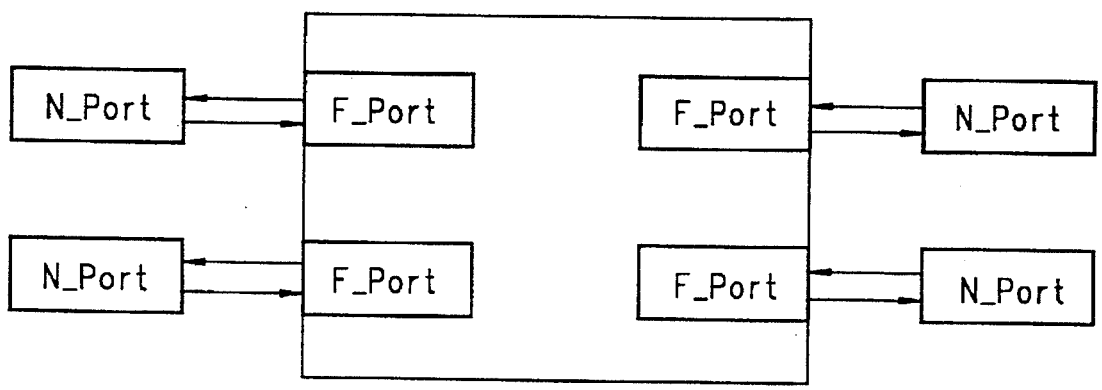
Figure 1C:
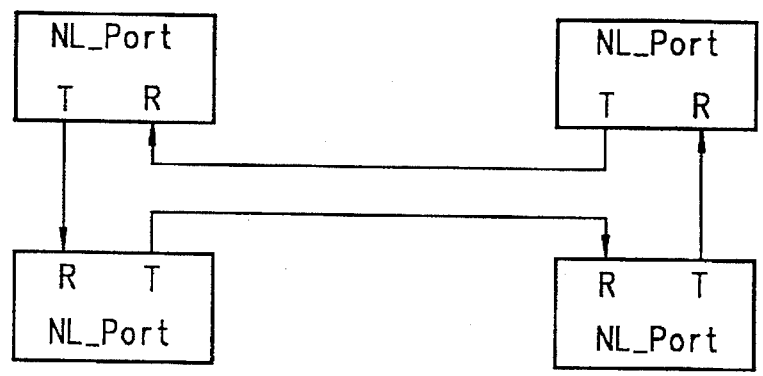
Figure 1D:
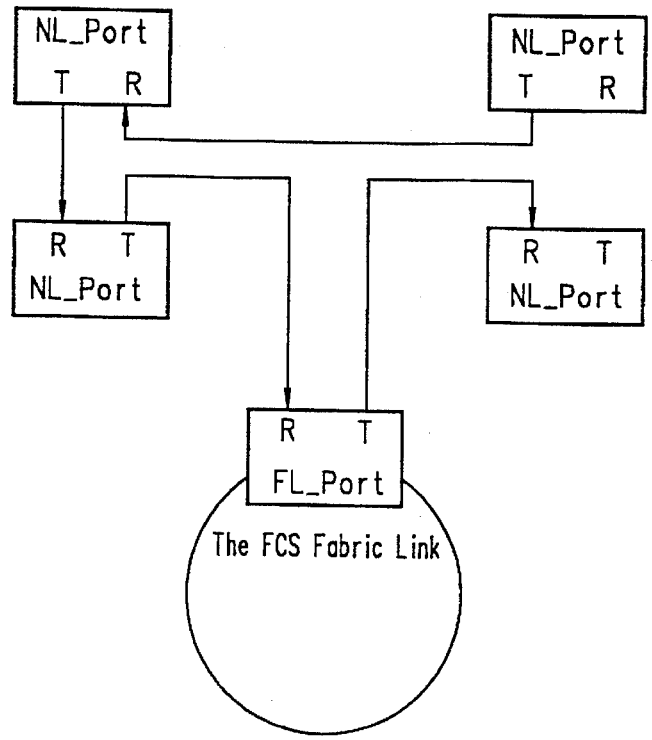
Figure 2:
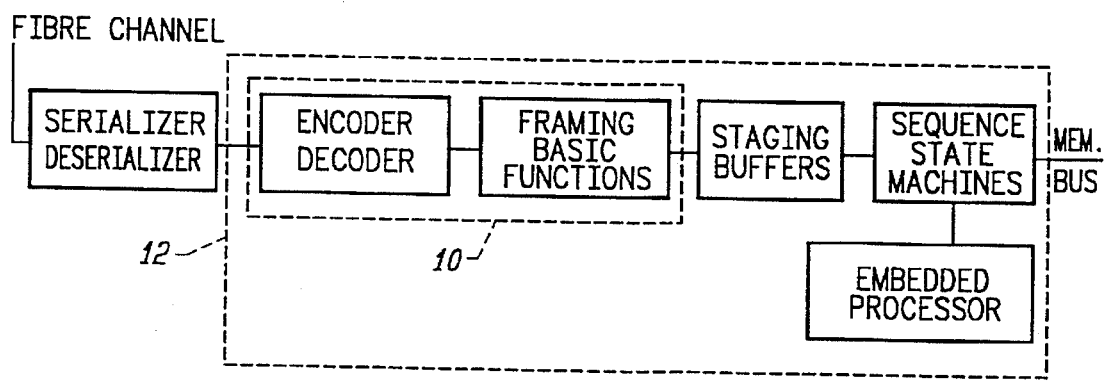
FIG. 2 is a functional block diagram of the NL Core and Super Core in implementing the transmission and framing protocols of the Fibre Channel Standard.
Figure 3:
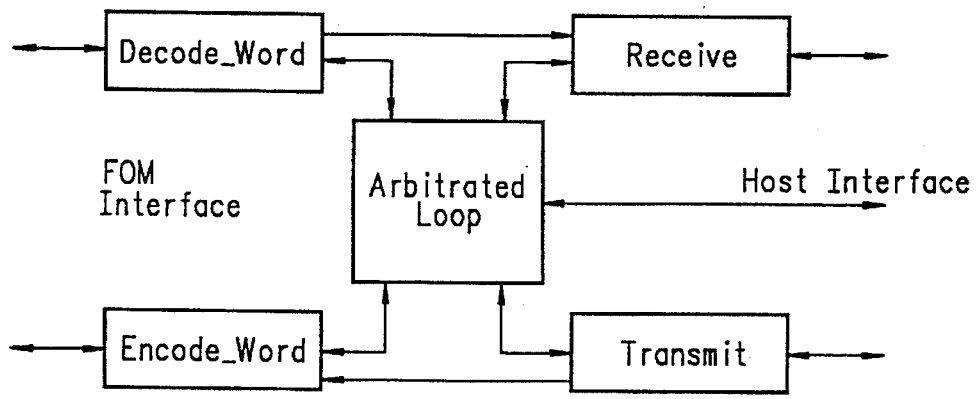
FIG. 3 is a functional block diagram of a Node Loop Core in accordance with the invention.

FIG. 3 is a functional block diagram of a Node Loop Core in accordance with the invention. The basic functional blocks include a Decode_Word unit 10 and an Encode_Word unit 12 which interface with the Fibre Channel Cable through a serializer/deserializer unit (not shown). The Decode_Word unit converts 10-bit to 8-bit data with error checking and performs comma character recognition in incoming data stream. The unit also constructs 32-bit parity protected words from half-words or bytes as programmed. Similarly, the Encode_Word unit converts 8-bit data to 10-bit encoded data with comma character generation. The unit also checks parity error of input words and divides the words into half-words or bytes as programmed.

An Arbitrated Loop 14 interfaces with the Decode_Word unit 10 and Encode_Word unit 12 along with a Receive Unit 16 and a Transmit Unit 18 and performs loop initialization protocol and loop arbitration functions. The Arbitrated Loop recognizes all primitive signals and sequences pertinent to the loop and includes a Loop State Machine and Loop Buffer.

Receive Unit 16 functions in frame parsing, frame steering, CRC error and logical error checking, primitive detection, and offset computation if offset is used.

The Transmit Block 18 performs frame construction from multiple sources, CRC generation, and primitive signal and sequence generation. The block also performs hardware managed sequences and software managed single frame sequence. The block also provides data frame sequence transmission and flow control.

Figure 4:
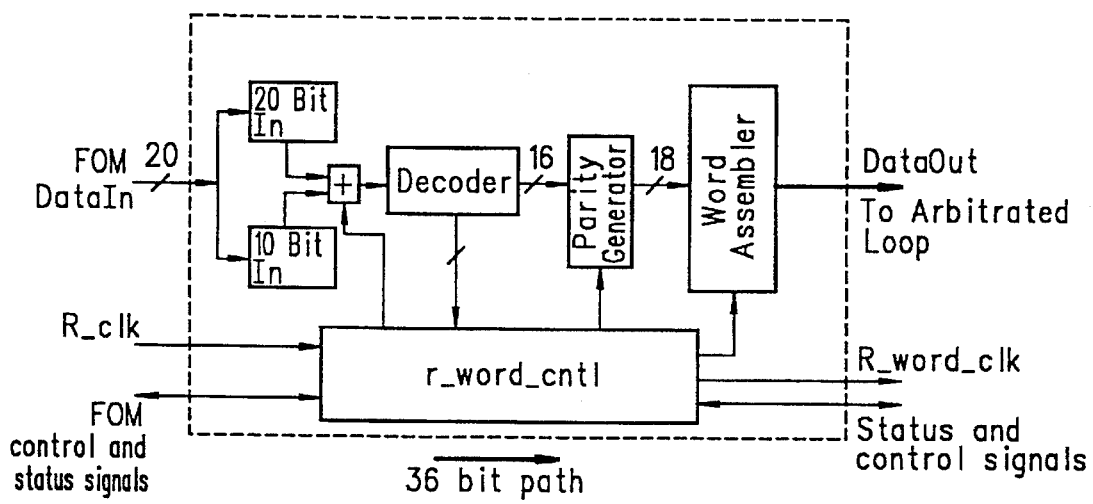
FIG. 4 is a functional block diagram of the Decode_Word block of FIG. 3.

FIG. 4 is a more detailed functional block diagram of the Decode_Word block of FIG. 3. The block includes a 20-bit input 40 which is the direct 20-bit data path used when this mode is enabled. A 10-bit input 42 is provided as the direct 10-bit data path when this mode is enabled. The input contains logic to convert the data path from 10 to 20 bits and to divide the incoming clock by 2. A decoder 44 contains two parallel 10-bit to 8-bit decoders with full error checking. Detected errors are posted via the Decode_Word status interface. A parity generator 46 operates and appends odd parity immediately after a decode, one parity bit per byte. This parity accompanies data throughout the NL Core.

A word assembler 48 assembles 32-bit parity protected data for the Arbitrated Loop. The receive word control (r_word_cntl) 49 receives status symbols and detects error signals and controls all operations in the Decode_Word block.

Figure 5:
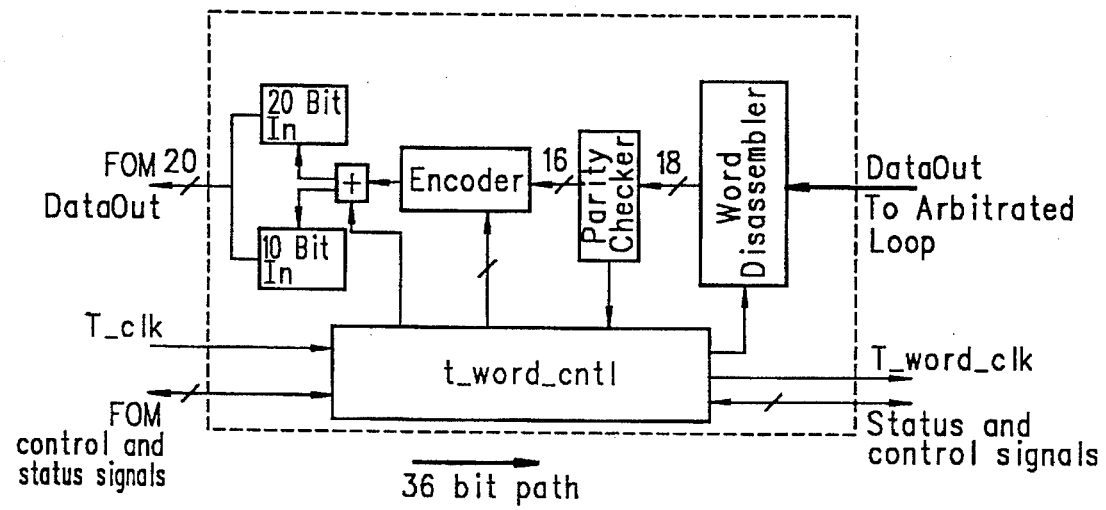
FIG. 5 is a functional block diagram of the Encode_Word block of FIG. 3.

FIG. 5 is a more detailed functional block diagram of the Encode_Word block 12 of FIG. 3. The block includes a 20-bit output 50 which provides the direct 20-bit data path when this mode is enabled. A 10-bit output 52 is a direct 10-bit data path when this mode is enabled. It contains logic to convert the data path from 10 to 20 bits and to divide the incoming clock by 2.

An Encoder 54 includes two parallel 8-bit to 10-bit encoders, and a parity checker 56 checks odd parity prior to encode and strips off the parity bit, one parity bit per byte.

Word Disassembler 58 disassembles 32-pit parity protected data into 16-bit parity protected data for the parity checker and encoder logic. The transmit word controller (t_word_cntl) 59 receives status signals and controls all the operations of the Encode_Word block. The transmit word clock (T_word_clk) is derived by this module using the T_clk input.

Figure 6:
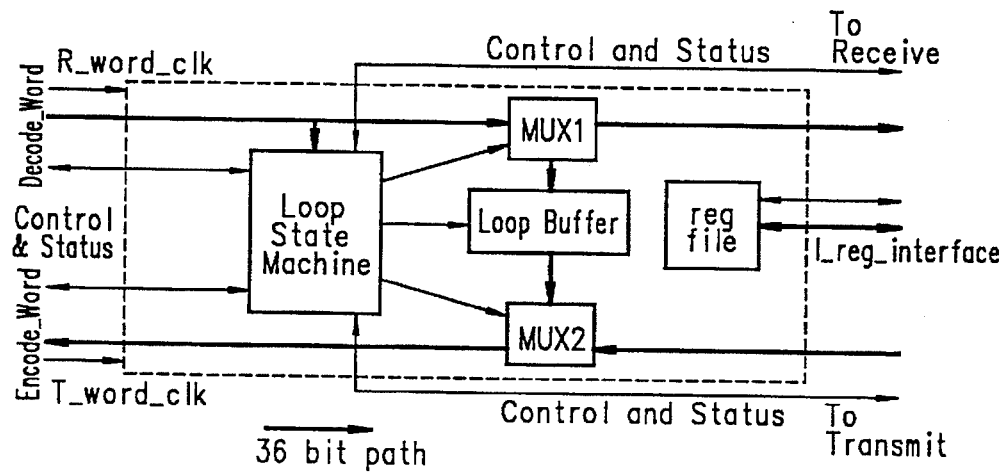
FIG. 6 is a functional block diagram of the Arbitrated Loop block of FIG. 3.

FIG. 6 illustrates the architecture of the Arbitrated Loop 14 of FIG. 3. A Loop State Machine 60 performs loop initialization protocol, loop arbitration, and detects all ordered sets pertinent to the Arbitrated Loop. The Loop State Machine is used to acquire Arbitrated Loop physical addresses at Power On, and after loop initialization the NL_Port goes into a monitoring state. When the loop is idle and the NL_Port wants to communicate with another NL_Port, loop arbitration protocol is performed by the Loop State Machine 60. When arbitration is won by any loop port, all the intermediate loop ports act as repeaters of transmission words. In this case, a loop buffer is used to provide the elasticity to re-time the data and send data to the transmitter. The Loop State Machine also looks for the primitive sequence which indicates that the present Arbitrated Loop connection is over.

A Loop Buffer 62 is six words deep so that received words are re-timed and transmitted through the Encode_Word block and transmitter.

A MUX1 unit 64 is a 36-bit multiplexer and is controlled by the Loop State Machine. When the NL_Port is participating in the communication with another NL_Port, then the data is presented to downstream logic through the Receive Block. When the NL_Port is not participating in the communication between any other two NL_Ports, the data is presented to the Loop Buffer 62.

A MUX2 unit 66 is a 36-bit multiplexer and is controlled by the Loop State Machine. When the NL_Port is participating in the communication with another NL_Port, then the data is received from downstream logic through the Transmit Block. When the NL_Port is not participating in the communication between any other NL_Ports, the data is received from Loop Buffer 62.

Figure 7:
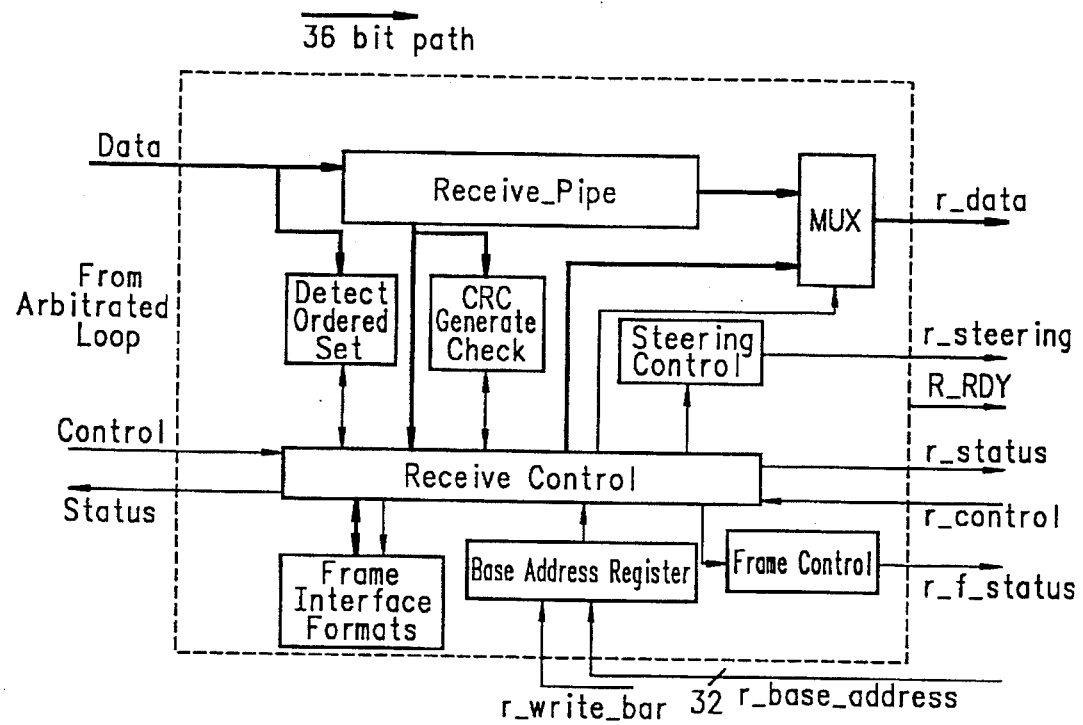
FIG. 7 is a functional block diagram of the Receive Block of FIG. 3.

FIG. 7 illustrates the architecture of the Receive Block 16 of FIG. 3. A Detect Ordered Set 70 detects primitive signals, primitive sequences, and frame delimiters. A CRC Generate Check 71 (Cycle Redundancy Check) is a 32-bit parallel CRC check network. This block generates a CRC for incoming frames (data imbedded between Start Of Frame (SOF) and End Of Frame (EOF) and checks for correct CRC. Detected errors are posted via the r_status interface.

Receive Pipe 72 provides decoded words for performing various computations in the Receive Engine. The output word will be either the pipeline stages or from the Receive Control.

Steering Control 73 provides all logic signals, performs frame parsing and steering. In steering unmodified mode, all frames with no modifications are presented to downstream logic so that custom steering mechanisms may be implemented with the help of frame status symbols. In the steering header class scheme, the headers are steered into different buffers than the device data or video data payload. All headers are modified for the convenience of the downstream logic using frame interface formats. All basic link control frames are steered in entirety to buffer to buffer flow control header buffers.

MUX 74 is a multiplier which provides data to the downstream logic. All Frame Interface Format (FIF) header changes are provided to downstream logic through the multiplexer which is controlled by the Receive Control 75.

The Frame Interface Formats unit 76 (FIF) converts frames from the FCS format to FIF, if this option is programmed. The FIF modifies SOF word, EOF word, and inserts two new words before the EOF word. FIF modifies the SOF field by writing a SOF code in horizontal format to the header HOF slot. At the completion of writing data to PL buffer, CRC is written to the Header Buffer, then the base address if offset is used.

Frame control 77 provides all necessary frame parsing information to downstream logic, which can be used for the custom steering implementations.

The Base Address Register 78 provides the base address for vectoring device data or video data frames to RAM. This has to be programmed prior to reception of a first frame of a sequence. If offset is used, the starting address for each new frame is computed and presented to downstream logic. The following table describes the function of the Base Address Register bits:
BAR Bits Description [31:0] Base byte address This is used for Class 1 frame sequences. This can be used for Class 2 sequences if sequence streaming is prohibited, and if the order of delivery is guaranteed. The FHDR sequence count is checked for validating all incoming Class 1 frames.

The Receive Control 75 provides all the required status signals to the downstream logic and controls functional blocks in the receive operation.

Figure 8:
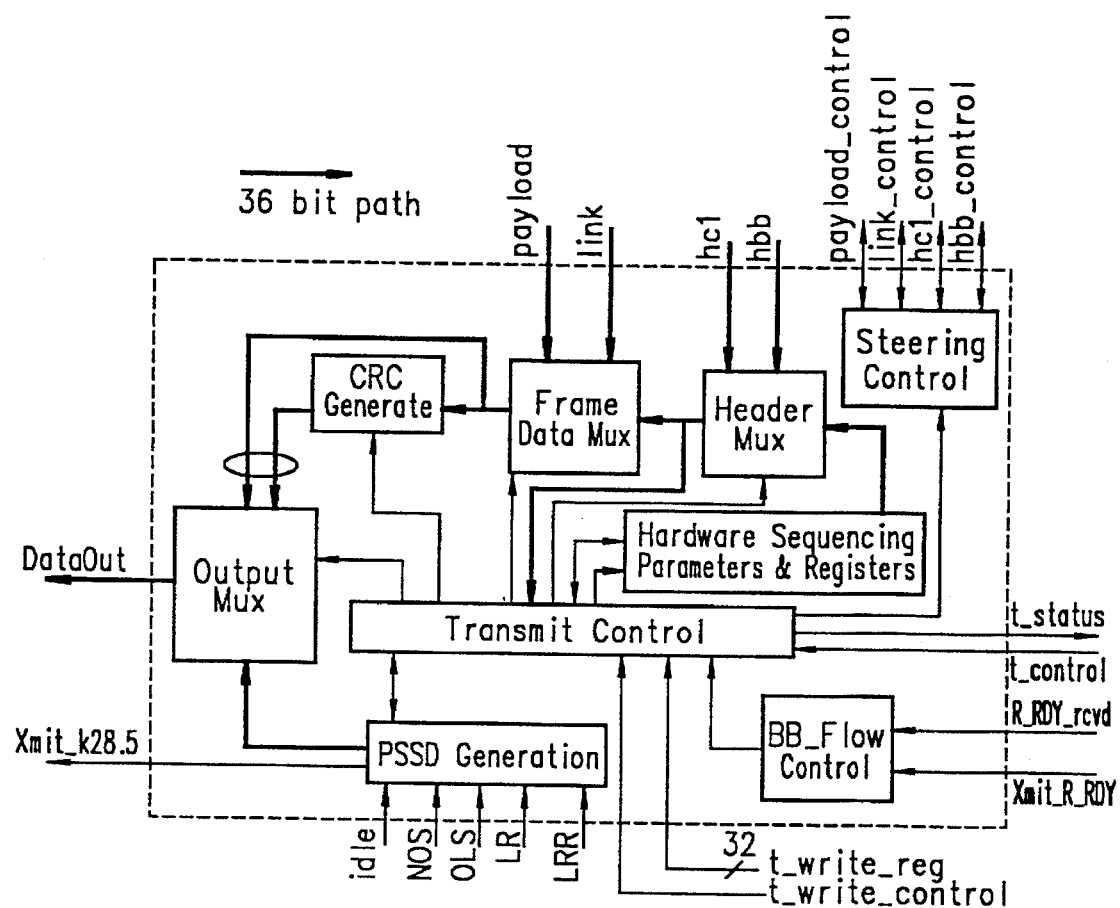
FIG. 8 is a functional block diagram of the Transmit Block of FIG. 3.

FIG. 8 illustrates the architecture of the Transmit Block 18 of FIG. 3. The CRC Generate Unit 80 generates the CRC for every frame excluding SOF and EOF delimiters. CRC is transmitted through the output MUX just before EOF and is controlled by transmit control.

The Transmit Control Unit 81 controls all of the blocks in the transmit operation. The major functions controlled by the Transmit Control are:

Single frames from the Frame Interface, through Payload FIFO.

A sequence of frames at the maximum FCS rate by utilizing the HMS mechanism. This is programmed using the register interface.

FCS Idles and Primitive Sequences

R_RDY_rcvd and Xmit_R_RDY for buffer-to-buffer flow control.

Frame delimiter generation, Frame Interface Formats option is programmed.

Offset generation for each data frame in the Hardware Managed Sequence (HMS), and transmitted as PARAMETER field in the frame header transmission.

CRC generation and transmitting CRC just before EOF transmission.

BB Flow Control 82 contains mechanisms for hardware-managed R_RDY flow control. A Credit Counter contains a four-bit count representing the number of outstanding BBFLO frames. The Credit Counter is compared against a programmable Credit Limit that defines the number of BBFLO buffer in the remote link receiver. If the Credit Counter reaches the programmable limit, which means the remote link receiver has no open buffer space, the NL_Core Transmit does not transmit any BBFLO frames until the remote link transmits a R_RDY signal. An R_RDY Counter keeps an 8-bit count of outstanding R_RDYs to be transmitted. Signal Increment_R_RDY is used for incrementing the counter. The NL_Core Transmit sends all outstanding R_RDYs at the earliest possible moment.

The hardware sequencing parameters and registers 83 provides the necessary parameters for hardware managed sequences. Frame header is of 6 words, and the first frame header sent is stored in 6 word size registers. A Hardware Managed Sequence Control register contains control information for transmitting a hardware managed sequence. The following table describes bits of this register:

| hms_ctl Bits | Description |
| --- | --- |
| 31 | Relative Offset (RO) arithmetic<br>0 = Do not use Relative Offset<br>1 = Use of Relative Offset[1] |
| [30:29] | Sequence Count initialization<br>00 = Set starting Frame Header SEQ_CNT = 0<br>01 = Set starting Frame Header SEQ_CNT = last Frame Header SEQ_CNT[2]<br>10 = Set starting Frame Header SEQ_CNT = first FHDR SEQ_CNT<br>11 = Not used |
| [28:24] | Not used |
| [23:0] | Frame Header F_CTL [23:0] for first and last frame of sequence[3] |

[1] When hms_ctl31 = 1, relative offset is computed and placed in the parameter field, through h_wd5_reg.
[2] Last FHDR SEQ_CNT = value of the SEQ_CNT of the last frame of the last hardware managed sequence, plus 1.
[3] For the first frame of sequence, abort sequence policy has to be transmitted. For all other frames, this field is not relevant. For the last frame of a sequence, the content of the hms_ctl[23.0] will be used for F_CTL. For all the intermediate frames, F_CTL[23:0] is similar to that of the first frame. This information is extracted by Transmit Control, and written in h_wd2 reg.

The HMS control register provides the Sequence Count (plus one) of the previous frame SEQ_CNT of a HMS. This value is necessary because the exact final Sequence Count cannot always be predicted ahead of time. The Register provides the starting Sequence Count for the next HMS if the Sequence count of the next sequence is a continuation of the previous sequence.

Frame Data Mux 84 multiplexes the data the and the headers of a frame. The output of this multiplexer is fed to the CRC Generate. In the steering_unmodified case, the header and payload come from the payload buffer. In steering_header_class case, the header comes form the Header MUX and the data from the Payload. This multiplexer is controlled by Transmit Control.

Header Mux 85 multiplexes the frame header from different sources depending on the class of service. If the hardware managed sequence is selected for a single sequence of any class, the header is selected form the Hardware Sequencing Parameters and the Registers blocks. Otherwise, the header is read from the hc1 port for class 1 frames and hc23 port for class 2/3. The multiplexer is controlled by Transmit Control 89.

The Output Mux 86 is the final multiplexer of the transmission words, before the words are presented to the Encode block through the multiplexer in the Arbitrated Loop. The multiplexer has three data paths; one path provides header and data, one provides SOF and EOF, and the third provides CRC to be transmitted just before EOF. The second path, which provides SOF and EOF delimiters, also provides primitive sequence and signal transmission.

PSSD Generation Block 87 performs Primitive Signal, Sequence, and Delimiter generation. Whenever primitive signal or primitive sequence or SOF/EOF delimiter is to be transmitted, the Xmit_k28.5 signal is asserted.

Steering Control 88 provides various control signals required to control construction of frames from multiple sources depending on user selected steering mechanisms.

Figure 9A:
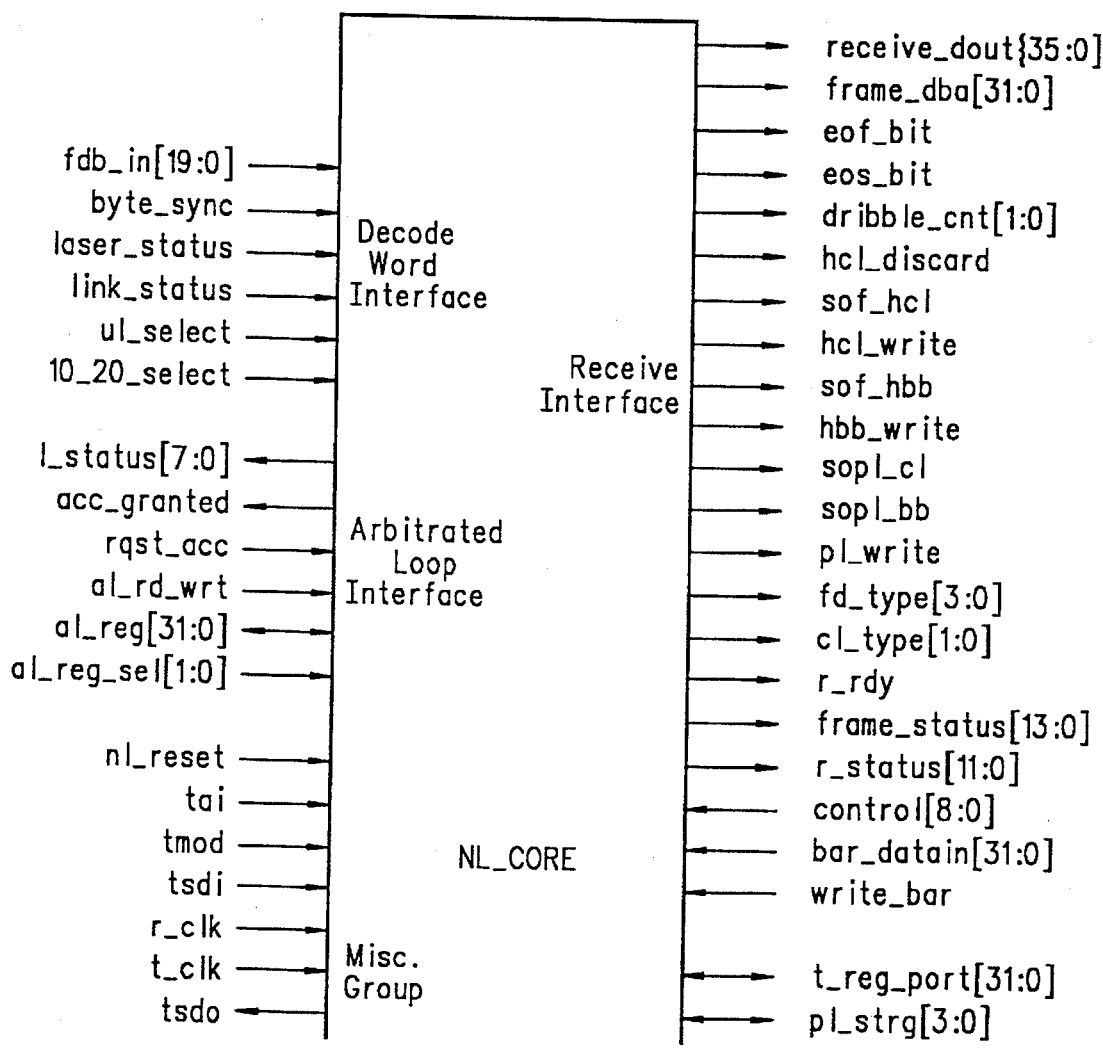
FIG. 9 illustrates signals for bit level logic interface of the Node Loop Core.
Figure 9B:
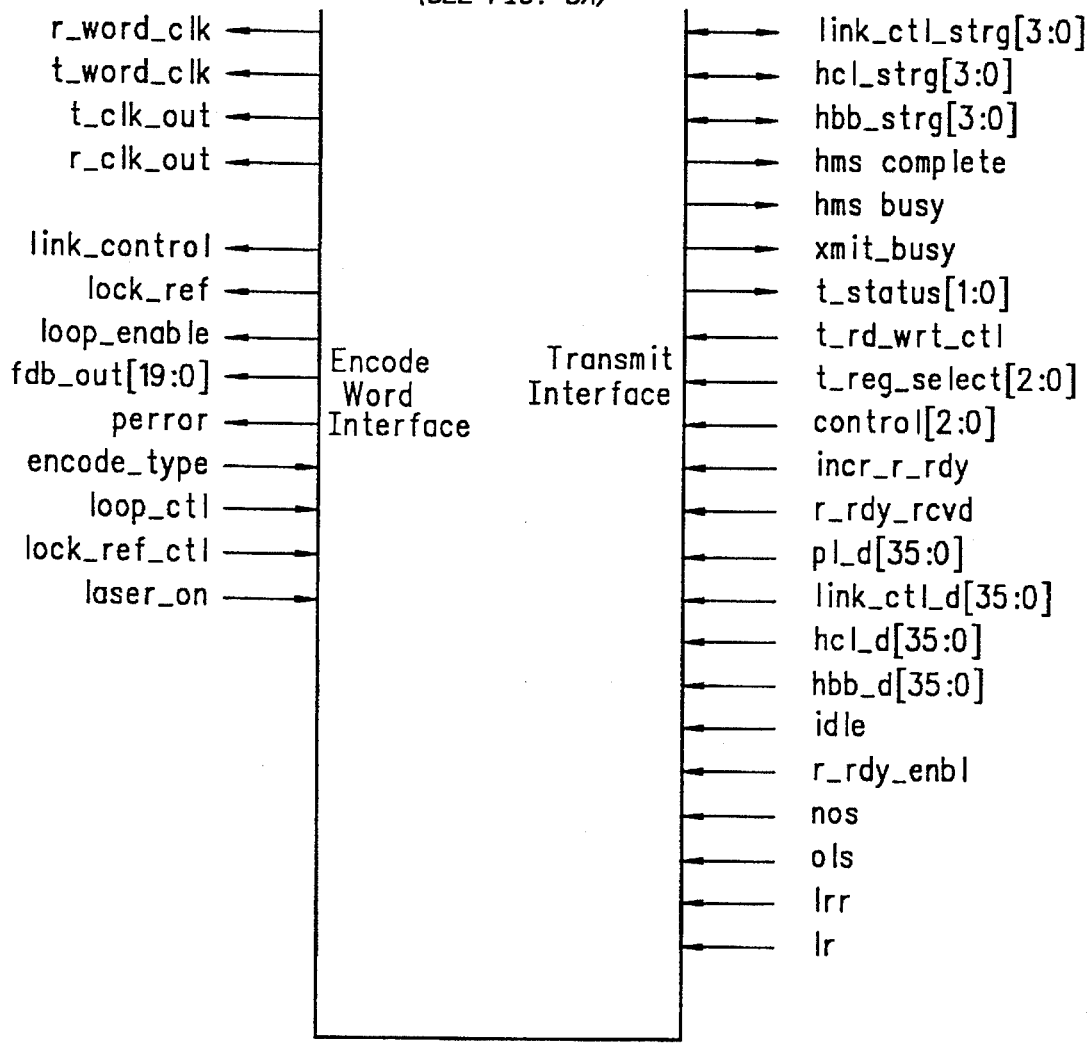

FIG. 9 illustrates the signal which comprise the bit level (logical) interface of the Fibre Channel NL_Port Core. The following is a description of the signals:

| | | | |
|---|---|---|---|
| Decode Word Signals | The Decode Word Module Interface receives all incoming signals from the Fiber Optic Module (FOM). This includes recovered receive data, data width control, and status from both the transmit and receive FOMs. | | |
| | FDB_IN[19:0] | FOM Data In<br>These signals contain two 10-bit FCS characters from the FOM. See subsection entitled "Decode_word Interface Formats" on page 4-24 for the pin format. | Input |
| | BYTE_SYNC | FOM Byte Sync<br>Asserting this signal indicates that there is a Special Character (the first character of all ordered sets) or a comma to be read on FDB_IN[19:0]. The FOM should assert this signal HIGH every time it detects a comma character. | Input |
| | LASER_STATUS | FOM Transmitter Laser Fault<br>Asserting this signal HIGH indicates that the FOM transmitter is detecting no laser output. The Receive passes this signal along as the STATUS_REG10 output. | Input |
| | LINK_STATUS | FOM Receiver Loss of Light (Open Fibre)<br>Asserting this signal HIGH indicates that the FOM receiver is detecting no signal. This signal is an input into the Receive State Machine. The Receive passes this signal along as the STATUS_REG9 output. | Input |
| | UL_SELECT | 10 bit upper/lower select<br>When using 10bit FOMs, this input selects whether the 10bit FOM input to the Receive is received in the upper 10bits or the lower 10bits of the 20bit FDB_IN[19:0] interface. | input |
| | 10_20_SELECT | 10bit/20bit select<br>Asserting this signal HIGH configures the Receive to accept 10bit FOM inputs. Deasserting this signal LOW configures the Receive to accept 20bit FOM inputs. | input |
| Encode Word Signals | The Encode Word Module Interface provides all outgoing data and control signals to the FOM. This includes the parallel transmission data and control for both the transmit and receive FOMs. | | |
| | LINK_CONTROL | Enable FOM Laser<br>The Encode asssserts this signal HIGH to turn on the FOM transmit laser. | Output |
| | LOCK_REF | Enable FOM Lock to Reference<br>The Encode asserts this signal HIGH to force the receive Phase Lock Loop (PLL) to lock to the reference oscillator. | Output |
| | LOOP_ENABLE | FOM Loop-Back Enable<br>The Encode asserts this signal HIGH to route FOM output to FOM input. | Output |
| | ENCODE_TYPE | FOM Type Select<br>Asserting this signal HIGH configures the Encode to send 10-bit FOM outputs. Deasserting this signal LOW configures the Encode to send 20-bit FOM outputs. | Input |
| | LOOP_CTL | FOM Loop-Back control<br>Asserting this signal HIGH enables Encode to generate LOOP_ENABLE signal. This a active in both 10 bit and 20 bit mode. | Input |
| | LOCK_REF_CTL | FOM Lock to Reference Control<br>Asserting this signal HIGH enable Encode to drive LOCK_REF output pin in either 10bit or 20bit mode. | Input |
| | LASER_ON | FOM Laser On<br>Asserting this signal HIGH enables Encode to drive LINK_CONTROL output signal in either 10bit or 20bit mode. | Input |
| | FDB_OUT[19:0] | Fibre Data Out<br>These signals contain two 10-bit FCS characters that go to the FOM. See subsection entitled "Encode_word Interface Formats" page 4-25 for the pin format. | Output |
| | PERROR | Parity Error<br>The Encode asserts this signal HIGH every time the Encode detects a parity error on either one of the two 8-bit characters just prior to being encoded to 10-bit. | Output |
| Arbitrated Loop Signals | The Arbitrated Loop (AL) interface signals are grouped into following subsections:<br>■ Status<br>■ Arbitration Control<br>■ Register Interface | | |
| Status | This group contains signals for indicating the operating status of the Arbitrated Loop. | | |

| | | -continued | |
|---|---|---|---|
| | STATUS_REG9 | Close state<br>Asserting this signal HIGH indicates that this port has recognized a Close sequence on the loop. | Output |
| | STATUS_REG8 | LIP Progress State<br>Asserting this signal HIGH indicates that the loop initialization is in progress. | Output |
| | STATUS_REG7 | LIP Complete State<br>Asserting this signal HIGH indicates that the Loop initialization is complete. | Output |
| | STATUS_REG6 | Opened State<br>Asserting this signal HIGH indicates that the both initiator and target Loop ports are ready for communication. | Output |
| | STATUS_REG5 | Open State<br>Asserting this signal HIGH indicates that this port is in Open state. This is the state during which a port sends a primitive sequence to open another port for communication. | Output |
| | STATUS_REG4 | Monitoring State<br>Asserting this signal HIGH indicates that this port is in Monitoring state. In this state, Link is monitored continuously for various Arbitrated Loop primitive sequences. | Output |
| | STATUS_REG3 | Repetition State<br>Assertion of this signal HIGH indicates that this port is in Repetition state. | Output |
| | STATUS_REG2 | Arbitration in Progress for this Node<br>Assertion of this signal indicates that this port is arbitrating for Loop. | Output |
| | STATUS_REG1 | Arbitration in Progress for other node<br>Assertion of this signal indicates that some other port is arbitrating. | Output |
| | STATUS_REG0 | No Operation<br>Loop is idle, LIP is complete and nothing is happening on loop. | Output |
| Arbitration Control | This group contains signals for Loop Arbitration. | | |
| | RQST_ACC | Access Request<br>This signal is asserted HIGH by the downstream logic when a communication is needed between this port and another port. | Input |
| | ACC_GRANTED | Access Granted<br>This signal is asserted HIGH when arbitration is won by this port. | Output |
| Register Interface | This group contains signals to interface AL registers to the downstream logic. | | |
| | AL_REG{31:0] | Arbitrated Loop register Data Port<br>This is a bidirectional 32 bit port used to access registers in AL. Data on this port is synchronous with T_WORD_CLOCK. | Input/Output |
| | AL_RD_WRITE | Arbitrated Loop Read Write Port Control<br>Asserting this signal HIGH indicates a READ operation and deasserting this indicates WRITE operation for the selected Register. | Input |
| | AL_REG_SELECT{1:0] | Arbitrated Loop register Select<br>These bits select one of the registers for read/write operation. | Input |

| Bit[1:0] | Register |
|---|---|
| 00 | AL_TMR_REGISTER |
| 01 | PORT_ACC_REGISTER |
| 10-11 | Reserved |

AL_TMR_REGISTER
This is a 32 bit register used for loop time-out functions.
PORT_ACC_REGISTER
This is a 32 bit register and contains fiels for AL-PA(8bits) and status conditions(8bits) of other port.

| | | | |
|---|---|---|---|
| Receive Signals | The Receive signals are grouped based on functional interface into the following subsections:<br>■ Receive Word Output<br>■ Steering<br>■ Flow Control<br>■ Frame Status<br>■ R_Status<br>■ Control<br>■ Register Interface | | |
| Receive Word Output | The Receive Word Output Interface provides the data output of the Receive Pipe. It includes word data in 8-bit format, odd parity for each byte. | | |
| | RECEIVE_DOUT[35:0] | Receive Data Out<br>These signals are the Receive Word Outputs, four parity protected 8-bit characters per R_word_clk. | Output |
| Steering | The NL_Core supports two types of steering mechanisms, Steering_Unmodified(SU) and Steering_Class_Header(SCH). This interface generates control signals to parse frame headers and payload in to their respective buffers. For SCH based steering, A Class1 data frame is parsed to send header to HC1 buffer and payload to pl_buffer. All Class1 link frames go to HC1 buffer. For data frames in SCH steering, header is steered to hbb_buffer and class 2/3 payload data is steered to pl_buffer. | | |

-continued

However, link frames go to hbb_buffer in entirety in Class2/3. In SU steering both data frames and link frames are directed to pl_buffer. However, custom steering is possible with control signals provided by the steering logic. The number of different buffers and the size of each is user-definable.

The interface uses a 32-bit parity protected data interface RECEIVE_DOUT[35:0] (four parity-protected bytes). The interface includes three write strobes (two for header buffers and one for pl_buffer), an end-of-frame signal, and a discard signal that discards unwanted frame headers after the write to the buffer is complete. All signals come directly from flip-flop outputs synchronous to the R_WORD_CLOCK.

| | | |
|---|---|---|
| FRAME_DBA[31:0] | Frame Data Base Address<br>These signals contain the starting buffer memory byte address for the Payload Data in the current frame. Offset computation is performed (if used) irrespective of the type of steering selected. | Output |
| EOF_BIT | End of Frame<br>The Receive asserts this signal HIGH coincident with the last word of frame. EOF delimiter is written if encoded fromat if FIF is chosen. | Output |
| EOS_BIT | End of Sequence<br>The Receive asserts this signal HIGH coincident with the EOF of the last frame of a sequence, as determined by FHDR F_CTL19. This signal is used for steering the data after it leaves the core. | Output |
| DRIBBLE_CNT[1:0] | Dribble byte count<br>The Dribble Count is the number of fill bytes that are in the last word of the frame. These signals reflect the FHDR F_CTL[1:0] inputs. These signals are provided for FC-PH service interface. | Output |
| HC1_DISCARD | Discard hc1_buffer Entry<br>The Receive asserts this signal HIGH coincident with the last word to be written to the pl_buffer(s). When asserted HIGH, this signal prevents HIF_LAST from forcing buffer control to switch to the next buffer, since the current buffer is still free. This signal is used to cause the buffering mechanism to discard the entire header entry it has just written. | Output |
| SOF_HC1 | Start of Frame to HC1 Buffer<br>The Receive asserts this signal HIGH in coincident with the SOF delimiter of a header write to HC1 buffer. This is applicable for both Data and Link Frames. | Output |
| HC1_WRITE | Write Word to hc1_buffer<br>The Receive asserts this signal HIGH coincident with every word that is to be written to the hc1_buffer(s). It is active for Class1 headers (Data Frames) and Class1 link frames except SOFc1. This signal is used as a buffer write pulse. | Output |
| SOF_HBB | Start of Frame to HBB Buffer<br>The Receive asserts this signal HIGH in coincident with SOF delimiter for headers and Frames written to hbb_buffer. | Output |
| HBB_WRITE | Write Word to hbb_buffer<br>The Receive asserts this signal HIGH coincident with every word that is to be written to the hbb_buffer(s). It is active on Class 2, Class 3 and SOFc1 frames. This signal is used as a buffer write pulse. | Output |
| SOPL_C1 | Start of Class1 Payload to PL_Buffer<br>The Receiver asserts this signal HIGH in coincident with the first word of the payload to the buffer. | Output |
| SOPL_BB | Start of BBFLO payload to PL_Buffer<br>The Receiver asserts this signal HIGH in coincident with the first word of the payload to the buffer. | Output |
| PL_WRITE | Write Word to PL_Buffer<br>The Receive asserts this signal HIGH coincident with every word of Device Data for Class 1 frames and Class 2/3 Frames. This signal is used to initiate a write to a pl_buffer. | Output |
| FD_TYPE[3:0] | Data Type (Device, Video, or Link)<br>These signals reflect FHDR R_CTL[27:24] and can be used to differentiate between various frame data types, primarily for the purpose of steering the data after it leaves the core. | Output |
| CL_TYPE[2:0] | Class Type<br>The Receive encodes these bit to show the Class type of the Frame in reception. | Output |

| CL bit | Class Type |
|---|---|
| 00 | Reserved |
| 01 | Class1 |
| 10 | Class2 |
| 11 | Class3 |

| | | |
|---|---|---|
| Flow Control | The Flow Control Interface provides a signal for hardware-managed R_RDY flow control.<br>Flow control ensures receiver's buffer availability. | |
| R_RDY | R_RDY Received | Output |

| | | | |
|---|---|---|---|
| | | The Receive asserts this signal HIGH for a clock cycle each time an R_RDY is received in the Receive. This signal should be used to decrement the Credit Counter (C_C) by connecting it to the R_RDY_RCVD input of the Transmit. | |
| Frame Status | | The Frame Status Interface provides an encoded description of parsed frames, indicating which portion of the frame is currently active on Receive Word Output[35:0], and any error conditions associated with the frame. | |
| | FRAME_STATUS6 | Frame Discard<br>This signal is asserted to specify that the current frame can be discarded by the downstream logic. This signal is valid only when the ENABLE_FRAME_DISCARD control bit is set and is derived from various error status bits. NL_Core asserts this signal when there is a frame anomaly, CRC error or decode error. | Output |
| | FRAME_STATUS5 | CRC Error<br>If a CRC error is detected, the NL_Core asserts this signal HIGH coincident with the last frame word on Receive Word Output[35:0]. | Output |
| | FRAME_STATUS4 | Decode Error<br>If a decode error is detected, The NL_Core asserts this signal HIGH coincident with any word on Receive Word Output[35:0]. | Output |
| | FRAME_STATUS[3:0] | Frame Parsing Tags<br>These signals are active concurrent with the Receive Word Output[35:0] data. These signals encode the frame status as follows:<br>FRAME_STATUS[3:0]<br>ST_IDLE 'h0 Not a frame word<br>ST_SOF 'h1 SOF word<br>ST_FHDR0 'h2 Frame Header 0 word<br>ST_FHDR1 'h3 Frame Header 1 word<br>ST_FHDR2 'h4 Frame Header 2 word<br>ST_FHDR3 'h5 Frame Header 3 word<br>ST_FHDR4 'h6 Frame Header 4 word<br>ST_FHDR5 'h7 Frame Header 5 word<br>ST_OHDR1 'h8 Optional Header 1 (Expiration) word<br>ST_OHDR2 'h9 Optional Header 2 (Network) word<br>ST_OHDR3 'ha Optional Header 3 (Association) word<br>ST_OHDR4 'hb Optional Header 4 (Device) word<br>ST_DATA 'hc Frame Data word<br>ST_CRC 'hd Frame CRC word<br>ST_FIF1 'he Frame FIF1 word, if FIF is selected<br>ST_EOF 'hf EOF word | Output |
| R_Status | | The Status Interface is a group of outputs that flag various states and events of Receive section of NL_Core. States are active for the duration of the translation, where events are active for a single clock cycle and are meant to be captured elsewhere in the ASIC. All signals come directly from flip-flop outputs synchronous to the R_WORD_CLOCK output. | |
| | STATUS_REG10 | Sequence Changed<br>The Receive asserts this signal HIGH when a new Sequence Frame is received during the current Sequence reception. | Output |
| | STATUS_REG11 | Exchange Changed<br>The Receiver asserts this signal HIGH whenever RX_ID changes during the Exchange reception. | Output |
| | STATUS_REG9 | Intermix Fault<br>The Receive asserts this signal HIGH if CTRL_REG5 is asserted HIGH and any Class 2/3 frame is received. (Asserting CTRL_REG5 selects the Non-intermix Mode.) | Output |
| | STATUS_REG8 | Not Operational Sequence (NOS) Detected<br>The Receive asserts this signal HIGH when detecting a Not Operational Sequence State on FDB_IN[19:0]. (See Note on page 3-13.) | Output |
| | STATUS_REG7 | OLS Detected<br>The Receive asserts this signal HIGH when detecting an Off-line Sequence State on FDB_IN[19:0]. (See Note on page 3-13.) | Output |
| | STATUS_REG6 | LRR Detected<br>The Receive asserts this signal HIGH when detecting a Link Reset Response Sequence State on FDB_IN[19:0]. (See Note on page 3-13.) | Output |
| | STATUS_REG5 | LR Detected<br>The Receive asserts this signal HIGH when detecting a Link Reset Sequence State on FDB_IN[19:0]. (See Note on page 3-13.) | Output |
| | STATUS_REG4 | Sequence Error<br>The Receive asserts this signal HIGH when it detects a sequence error. A sequence error occurs when the FHDR SEQ_CNT is not equal to the HMS_SEQ_CNT Internal Register for all classes, if CTRL_REG8 is asserted HIGH.<br>If CTRL_REG5 is deasserted LOW(Intermix selected), Sequence Validity is not checked. | Output |
| | STATUS_REG3 | Frame Interrupt Error<br>The Receive asserts this signal HIGH to indicate that it detected a frame anomaly. A frame anomaly is caused by one of the following events:<br>(a) A SOF occurred before the previous frame completed. | Output |

-continued

| | | | |
|---|---|---|---|
| | | (b) An IDLE occurred before EOF was reached. | |
| | | (c) An EOF occurred when there was not a frame in progress. | |
| | STATUS_REG2 | Decode Error | Output |
| | | The Receive asserts this signal HIGH when it detects an error on the incoming 10-bit data. | |
| | STATUS_REG1 | CRC Error | Output |
| | | The Receive asserts this signal HIGH when it detects a frame CRC error. | |
| | STATUS_REG0 | Sync Acquired | Output |
| | | The Receive asserts this signal HIGH to indicate the core is in the Sync Acquired State as defined by the FCS. The Receive deasserts this signal LOW to indicate that the Receive state machine is in the Not Sync Acquired State as defined by the FCS. | |
| Note: | This signal follows FCS rules by activating on detection of three consecutive valid transmission words of this type. It deactivates on a single non-occurrence of a valid transmission word of this type. The Link Control State Machine can be implemented in either additional ASIC logic or in software. The state machine should use a capture-hold register to save this status. | | |
| Control | The Control Interface is a group of inputs that are used to configure the Receive section of NL_Core. All signals are assumed to be synchronous to the R_WORD_CLOCK. | | |
| | CTRL_REG6 | Enable Sequence Validity Check | Input |
| | | Asserting this signal HIGH enables sequence validity checking. It may be necessary to provide sequence validity for Intermix operation provided the Fabric assures the in-order delivery of frames in each class. | |
| | CTRL_REG5 | Enable Frame Interface Formats | Input |
| | | Asserting this signal HIGH enables encoding of the received frame to Frame Interface Format. | |
| | CTRL_REG4 | Steering Select | Input |
| | | Asserting this signal HIGH selects Steering_Unmodified, which suppresses any attempt to modify incoming frames. Deasserting this signal LOW selects class header based steering. | |
| | CTRL_REG3 | Non-Intermix Select | Input |
| | | Asserting this signal HIGH selects Non-intermix Mode. Deasserting this signal LOW selects Intermix Mode. | |
| | CTRL_REG2 | Force Parity Error | Input |
| | | Asserting this signal HIGH forces the generated parity to be false (even parity) in order to test downstream parity detectors. Both byte parity generators generate even parity instead of the default odd parity. | |
| | CTRL_REG1 | Enable Frame Discard | Input |
| | | Asserting this signal HIGH enables Frame discard status signal (FRAME_STATUS6). | |
| | CTRL_REG0 | On-line Enable | Input |
| | | Asserting this signal HIGH puts Receive in the on-line state, as defined by the FCS. FC-2 level logic should assert this signal after Link Initialization is performed. | |
| Register Interface | The Register Interface is a 32-bit path used to write to the Base Address Register(BAR). For more information on the BAR Register see the subsection entitled "Base Address Register", page 2-15. | | |
| | BAR_DATAIN[31:0] | BAR Register Data Inputs | Input |
| | | These signals are inputs to the BAR Register. While WRITE_BAR is active. BAR_DATAIN must be synchronous with to the R_WORD_CLOCK. | |
| | WRITE_BAR | Base Address Register Write Strobe | Input |
| | | Asserting this signal HIGH initiates writing BAR_DATAIN[31:0] into the Base Address Register. This signal must be synchronous to the R_WORD_CLOCK and should be asserted for at least one clock cycle. T | |
| Transmit Signals | The Transmit signals are grouped by interface into the following subsections: | | |
| | Register Interface | | |
| | T_Status | | |
| | Control | | |
| | Transmit Steering | | |
| | Transmit Frame | | |
| | Flow Control | | |
| | Primitive Sequence Transmission | | |
| Register Interface | This interface contains signals for writing into and reading from HMS_CTL_REG, HMS_SEQ_CNT, R_R, C_C and Credit Limit registers. For more information see subsection entitled "Hardware Sequencing Parameters & Registers", page 2-19. All signals are synchronous to T_WORD_CLOCK. | | |
| | T_REG_PORT[31:0] | Transmit Register Access Port | Input/Output |
| | | These port signals are common to all register access and are synchronous to T_WORD_CLOCK | |
| | T_RD_WRT_CTL | Transmit Register Read Write Control | Input |
| | | These signals control read and write operation to the selected register. Asserting this signal HIGH selects read and a LOW selects write operation. | |

-continued

| | T_REG_SELECT[2:0] | Transmit Register Select<br>These bits select a particular register as follows: | input |
|---|---|---|---|

| Bit[2:0] | Register Name |
|---|---|
| 000 | HMS_CTL_REGISTER |
| 001 | HMS_SEQ_CNT |
| 010 | R_R |
| 011 | C_C |
| 100 | Transmit Credit Limit |
| 101–111 | None Selected |

HMS_CTL_REGISTER
This is a 32 bit register used to control Hardware Managed Sequence implementation.
HMS_SEQ_CNT
This is a 16 bit register which holds the final sequence count (plus one) after a sequence transmission is complete. This value can be used in the initial frame header of a subsequent sequence, if that sequence is a continuation of a prior, non-contiguous sequence.
R_R Counter
This is a 8 bit counter register and the Transmit uses these signals to keep a count of the number of R_RDY Primitive Signals yet to be transmitted. The count ranges from 0x0 to 0xFF.
C_C Counter
This is a 8 bit counter register and the Transmit uses these signals to keep the current credit count at the destination link receiver. The count ranges from 0x0 to 0xFF.
Transmit Credit Limit
This is a 8 bit counter register which is programmed using login parameters to set credit limit.

| | | | |
|---|---|---|---|
| T_Status | The Status Interface is a group of outputs that flag various Transmit states and events. States are active for the duration of the state transition, where events are active for a single clock cycle and are meant to be captured elsewhere outside this core. All signals come directly from flip-flop outputs synchronous to the T_WORD_CLOCK. | | |
| | STATUS_REG1 | HMS Complete<br>The Transmit asserts this signal HIGH to flag when the Transmit engine transmits EOF of the last frame. | Output |
| | STATUS_REG0 | HMS Busy<br>The Transmit asserts this signal HIGH from the time the HMS_CTL_REG is written until the Transmit engine has transmitted EOF of the last frame of the sequence. | Output |
| Control | The Control Interface is a group of inputs that are used to configure the Transmit. All signals are assumed to be synchronous to the Transmit Clock. | | |
| | CTRL_REG2 | Flow Control Reset<br>Asserting this signal HIGH resets the R_R and the C_C. | Input |
| | CTRL_REG1 | Force CRC Error<br>Asserting this signal HIGH forces CRC errors. For as long as this signal is asserted HIGH, the Transmit forces incorrect CRC on all frames transmitted, which causes the destination link receiver to detect and report this type of error. | Input |
| | CTRL_REG0 | Force 10-Bit Decode Error<br>Asserting this signal HIGH forces a 10-bit decode error. When this signal is HIGH, the Transmit outputs IDLEs with incorrect disparity, which causes the destination link receiver to detect and report this type of error. | Input |
| Transmit Steering | This group contains signals to provide handshake mechanism with external buffers. | | |
| | XMIT_BUSY | Transmit Busy<br>This signal is asserted HIGH during the period from SOF to EOF of any frame transmission. | Output |
| | PL_RD | Read enable for PL_buffer<br>This signal is asserted HIGH when the Transmit decides to read a word from PL_buffer. | Output |
| | PL_RDY | Frame Payload Ready to Transmit<br>This signal is asserted HIGH when the payload is ready to be transmitted in the downstream logic. Transmit uses PL_RDY and XMIT_BUSY to control PL_RD generation. | Input |
| | PL_FIRST | Payload First Word indicator<br>This signal is asserted during the period when the first word of the payload is being read into the transmit. | Output |
| | PL_LAST | Payload Last Word indicator<br>This signal is asserted HIGH by the external logic to indicate the last word transfer of the payload. | Input |
| | LINK_CTL_RD | Link Control Frame Read Enable<br>This signal is asserted HIGH when the Transmit decides to read a word of Link Control Frame. | Output |
| | LINK_CTL_RDY | Link Control Frame Ready<br>This signal is asserted HIGH by the downstream logic to indicate the availability of Link Control Frames. | Input |

| | | | |
|---|---|---|---|
| | LINK_CTL_FIRST | Link Control Frame First Word indicator<br>This signal is asserted HIGH during the period when the first word of Link Control Frame is being transmitted. | Output |
| | LINK_CTL_LAST | Link Control Frame Last Word indicator<br>This signal is asserted HIGH by the external logic indicate the last word of a Link Control Frame. | Input |
| | HC1_RD | Class1 Buffer Read Enable<br>This signal is asserted HIGH when the Transmit decides to read a word from HC1 buffer. | Output |
| | HC1_RDY | Class1 Header Ready<br>This signal is asserted HIGH to indicate the availability of Class1 header. | Input |
| | HC1_FIRST | Class1 Header First Word indicator<br>This signal is asserted HIGH during the period when the first word of a Class1 frame header is being read. | Output |
| | HC1_LAST | Class1 Header Last Word indicator<br>This signal is asserted HIGH by the external logic to indicate the last word transfer of Class1 header. | Input |
| | HBB_RD | hbb_buffer Read Enable<br>This signal is asserted HIGH when the transmit decides to read a word from HBB buffer. | Output |
| | HBB_RDY | BBFLO Frame Ready<br>This signal is asserted HIGH to indicate the availability of BBFLO frame. | Input |
| | HBB_FIRST | BBFLO Frame First Word<br>This signal is asserted HIGH during the period when the first word from a hbb_buffer is being transmitted. | Output |
| | HBB_LAST | BBFLO Frame Last Word<br>This signal is asserted HIGH by the external logic to indicate the last word transfer of a hbb_buffer. | Input |
| Transmit Frame | This group contains signals for datapaths for Payload, Link Control, HC1 and HBB word datum. | | |
| | PL_D[35:0] | Payload Data Bus<br>This is a 32 bit parity protected data path for the payload. | Input |
| | LINK_CTL_D[35:0] | Link Control Frame Data Bus<br>This is a 32 bit parity protected data path for Link Control Frames. | Input |
| | HC1_D[35:0] | Class1 Header Data Bus<br>This is a 32 bit parity protected data path for Class1 headers. | Input |
| | HBB_D[35:0] | BBFLO Frame Data Bus<br>This is a 32 bit parity protected data path for BBFLO headers. | Input |
| Flow Control | The Flow Control Interface provides signals for managing R_RDY flow control mechanisms in the Transmit. | | |
| | INCREMENT_RRDY | Increment R_R Counter<br>Asserting this signal HIGH increments the R_R Counter. This event should occur once every time the NL_Port's BBFLO input buffer is emptied of an entry. Since the event probably originates in a different clock domain, this input feeds a resynchronization signal and a one-shot, thus incrementing the R_R Counter once per high-going edge. | Input |
| | RRDY_RCVD | Decrement C_C<br>Asserting this signal HIGH decrements the C_C by one. This signal should be asserted every time the Receive in the same NL_Port receives an R_RDY Primitive Signal (it is meant to be connected to the Receive R_RDY output pin). This input feeds a resynchronization and one-shot, thus decrementing the C_C once per high-going edge. | Input |
| Primitive Sequence Transmission | These signals enable the Transmit to transmit Primitive Signals and Sequences (Continuous Ordered Sets) on FDB_OUT[19:0] as follows: | | |
| | IDLE | Idle Primitive Signal Enable<br>Asserting this signal HIGH enable Transmit to schedule an IDLE primitive signal transmission. | Input |
| | R_RDY | R_RDY Primitive Signal Enable<br>Asserting this signal HIGH enables Transmit to schedule a R_RDY primitive signal transmission. | Input |
| | NOS | Not Operational Primitive Sequence Enable<br>Asserting this signal HIGH enables Transmit to schedule a NOS primitive sequence for transmission. | Input |
| | OLS | Off-line Enable<br>Asserting this signal HIGH enables Transmit to schedule a OLS primitive sequence for transmission. | Input |
| | LRR | Link Reset Response Enable<br>Asserting this signal HIGH enables Transmit to schedule a LRR primitive sequence for transmission. | Input |
| | LR | Link Reset<br>Asserting this signal HIGH enables Transmit to schedule a LR primitive sequence for transmission. | Input |
| 3.6 Miscellaneous Signals | This group contains signals for test, clock generation and reset operation. | | |
| Test and Scan | The Test and Scan Interface controls the scan test mechanism that is used for ASIC production tests. | | |
| | TAI | Asynchronous Clear Enable<br>Asserting this signal HIGH disables all flip-flop asynchronous | Input |

| | | | |
|---|---|---|---|
| | TMOD | sets or resets during the scan process.<br>Test Mode<br>Asserting this signal HIGH puts all flip-flops in the test mode for scan. | Input |
| | TSDI | Scan Data In<br>This signal feeds the first flip-flop of the scan chain. | Input |
| | TSDO | Scan Data Out<br>This signal is fed by the last flip-flop of the scan chain. | Output |
| Clock Out | The Clock Out Interface feeds condition versions of the source clock to external circuits. | | |
| | R_WORD_CLK | Receive Word Clock<br>This word clock is derived from R_CLK. R_CLK divided by two drives this output for 20 bit mode and R_CLK divided by four in 10bit mode. | Output |
| | T_WORD_CLK | Transmit Word Clock<br>This word clock is derived from T_CLK. | Output |
| | T_CLK_OUT | Copy of the T_CLK Clock input<br>This is a buffered version of T_CLK and may be used elsewhere. | Output |
| | R_CLK_OUT | Copy of the R_CLK Clock input<br>This is a buffered version of R_CLK and may be used elsewhere. | Output |
| TClock In | Clock In Interface takes clock sources from FOM modules. | | |
| | R_CLK | Receiver Recovered Clock<br>The FOM byte clock inputs this signal. It should cycle once every two 10-bit characters if in 20-bit mode, or once every one 10-bit character in 10-bit mode. This clock must have one of the following nominal frequencies ± 100 PPM:<br><br>FCS Speed    Frequency (in MHz)<br><br>Full    53.125<br>Half    26.5625<br>Quarter    13.28125<br>Eighth    6.640625 | Input |
| | T_CLK | Transmitter Clock<br>The FOM byte clock inputs this signal. It should cycle once every two 10-bit characters if in 20-bit mode, or once every one 10-bit character in 10-bit mode. This clock must have one of the following nominal frequencies ± 100 PPM:<br><br>FCS Speed    Frequency (in MHz)<br><br>Full    53.125<br>Half    26.5625<br>Quarter    13.28125<br>Eighth    6.640625 | Input |
| | NL_RESET | Assertion of this signal puts all the sequential elements in the NL_Core in its reset state. | Input |

Disclosed now are the core operation and formats, including Core Setup, Arbitrated Loop Programming, Receive Programming, Transmit Programming, and Frame Interface Formats (FIF).

Core Setup

Following is a description of the steps necessary for setting up the Node Loop core.

Power on Reset value for all the registers is zero.
1. Reset the Node Loop core. Assert Reset signal LOW for at least 4 clock cycles.
    Arbitrated Loop: NL_Core reset resets arbitrated loop circuitry. The loop set up is completed when the loop initialization protocol is complete, which initializes the AL_PA (arbitrated loop physical address).
    Receive
    While CTRL_REG2 is asserted, program the FOM Type signal, CTRL_REG[1:0], the Input Character Select signal, CTRL_REG4, the Intermix Select signal, CTRL_REG5, and the Steering Select signal, CTRL_REG6. For more information on these signals, see the subsection entitled "Control" on page 3-13.
    Transmit
    While Reset is asserted LOW, program the FOM Type signal, CTRL_REG6. For more information on this signal, see the subsection entitled "Control" on page 3-17.
    Deassert the reset signals.
2. Set up buffer-to-buffer flow parameters for the Transmit.
    Load the number of buffers available (acquired at login) into the Credit Limit signals, CTRL_REG[15:12]. For more information on these

Figure 10A:
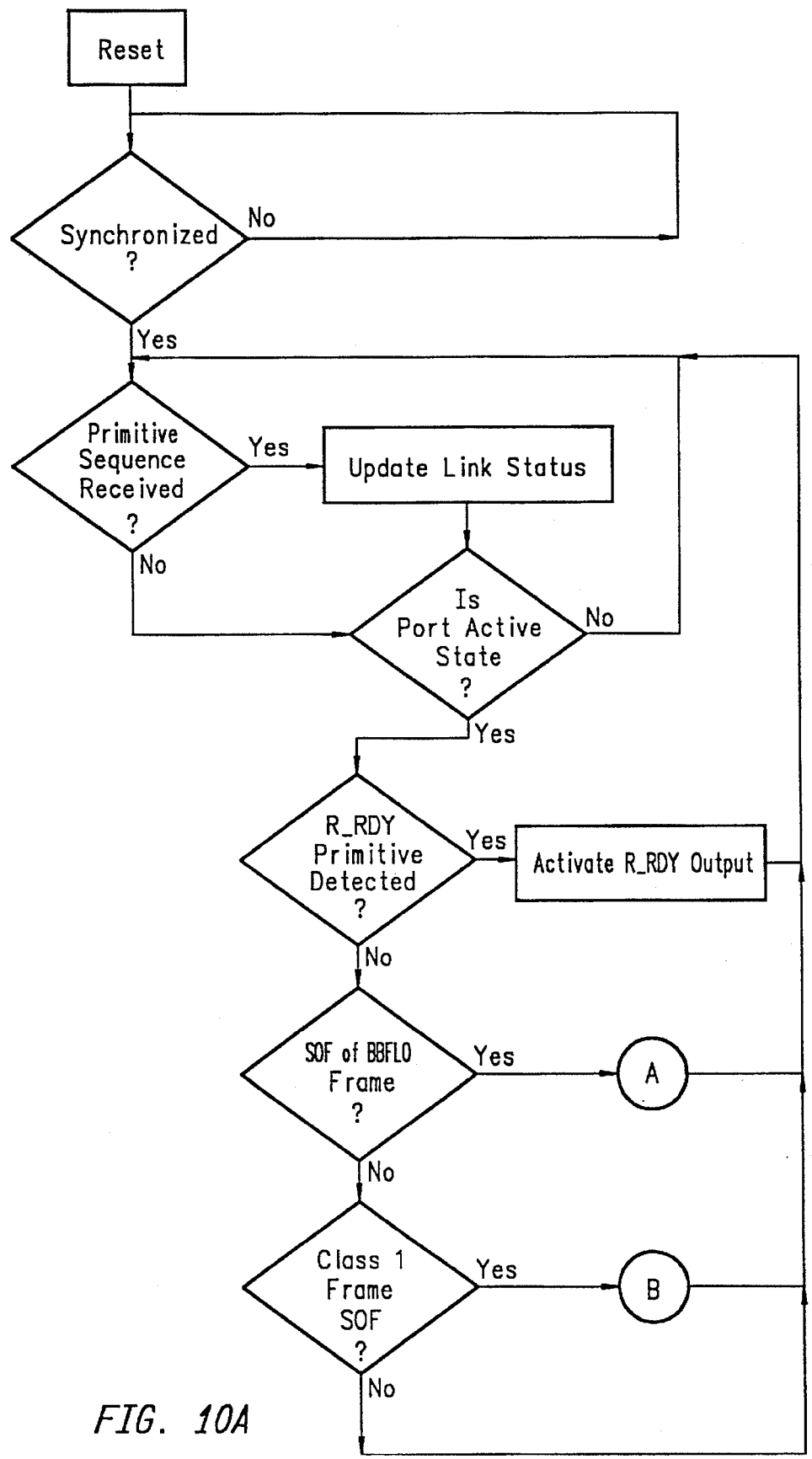
FIGS. 10A–10C are flow diagrams of a receive operation.
Figure 10B:
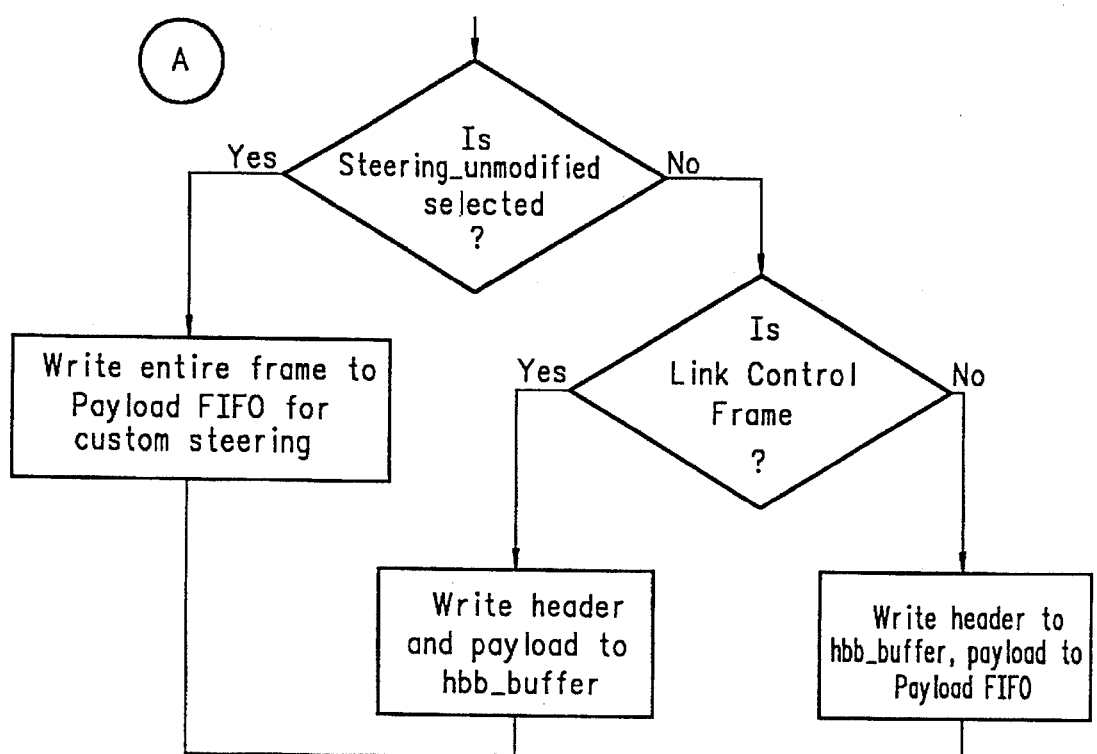
Figure 10C:
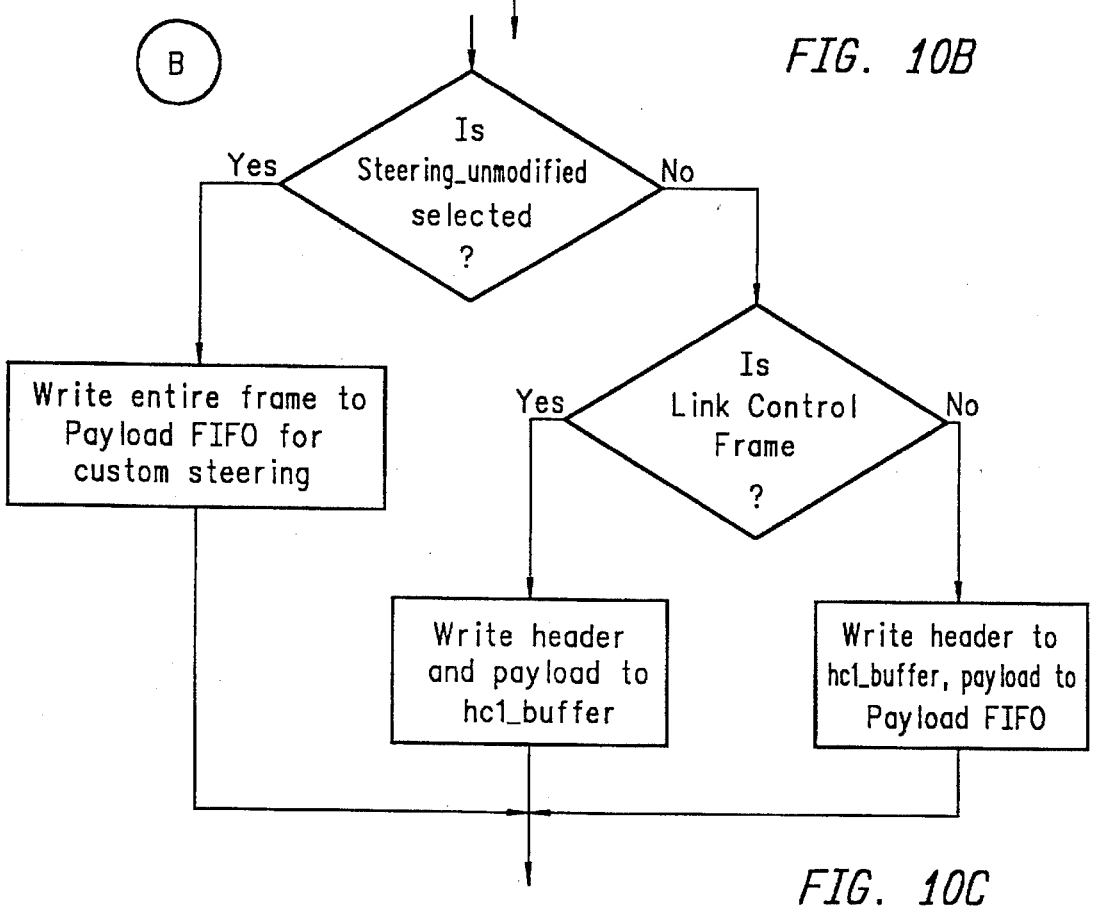
Figure 11A:
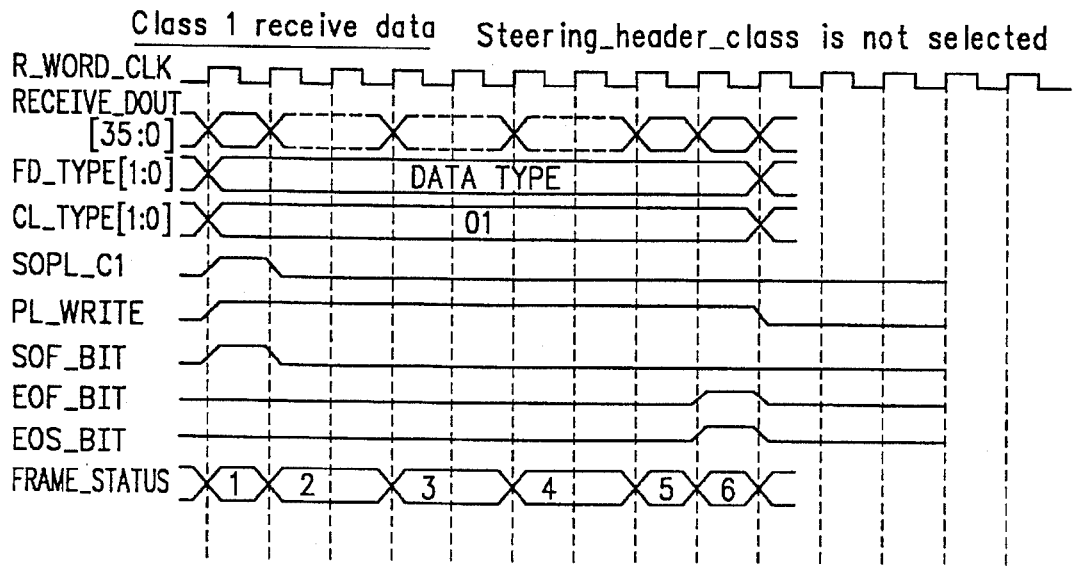
Figure 11B:
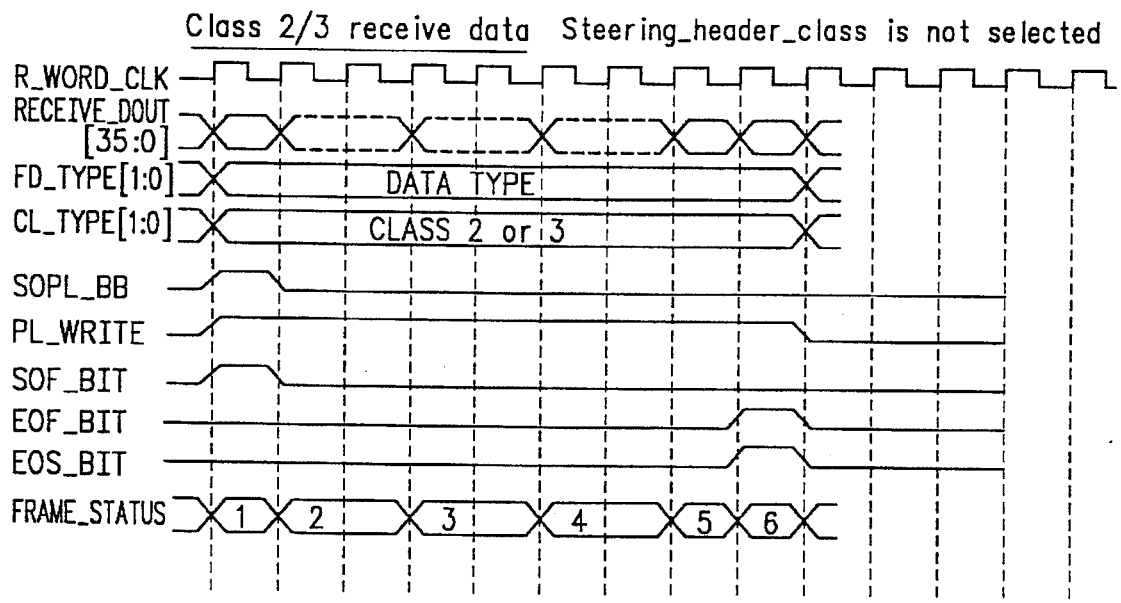
Figure 12:
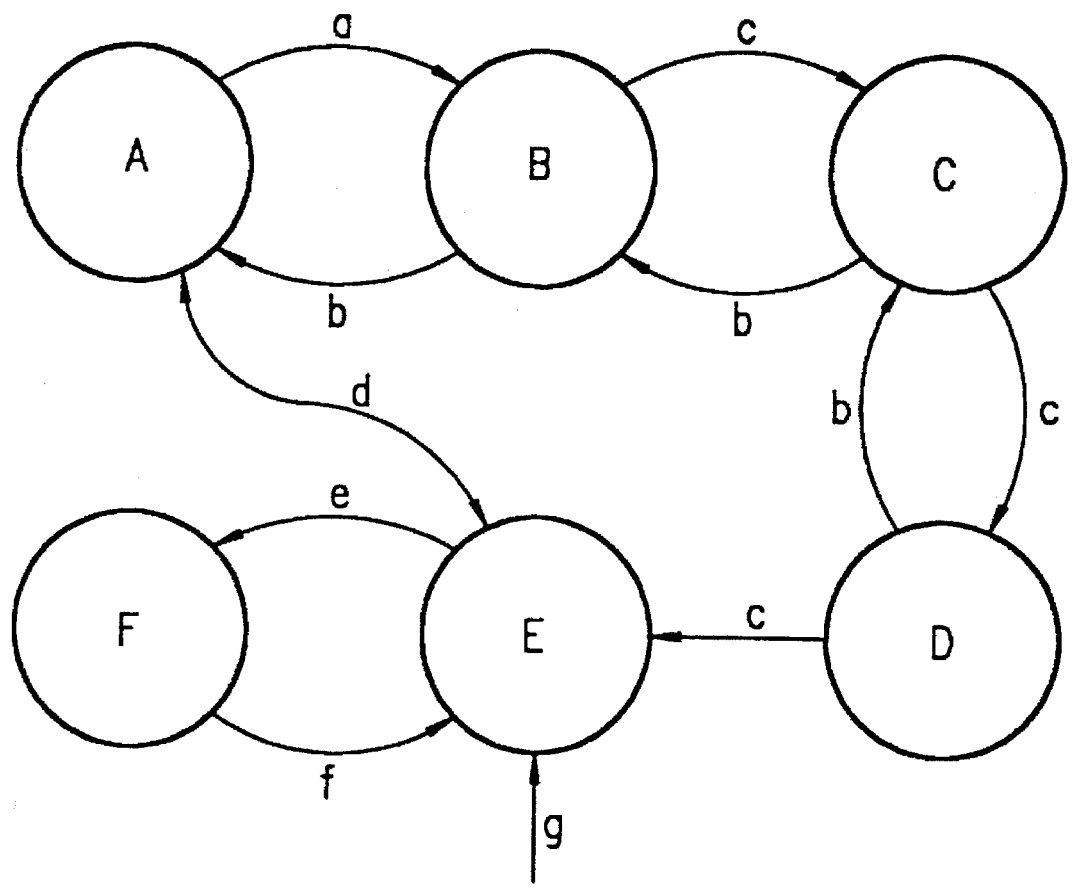
FIG. 12 illustrates a receive word synchronization state machine diagram.

| | |
|---|---|
| | signals, see the subsection entitled "Control" on page 3-17. |
| | 3. Program the Base Address Register (BAR) for the Receive operation if Offset is used. At power on, the register value is 0, therefore it needs to be programmed by downstream logic before it is used. Load the base address into base address register[31:0], and then pulse the BAR with Write_BAR strobe, synchronous to the R_word_clk clock. For more information on the Base Address Register see the subsection entitled "Register Interface" on page 3-14 and the subsection entitled "Base Address Register" on page 2-15. |
| Arbitrated Loop Programming | Once NL_Core is set up, the arbitrated loop operates on-line. "Core Setup" describes NL_Core setup. Whenever loop access is required REQUEST_ACCESS is asserted by the downstream logic. Loop State Machine (LSM) checks if nobody using loop, if so, LSM initiate ARBx, where x is AL_PA. LSM waits until ARBx comes back through loop, then LSM goes into Arbitration_won state and will try to open required port for unidirectional or bidirectional data transfers. At the end of the data transfers, NL_Port transmits a close sequence (CLS). If loop is being used by any other two ports, NL_Port waits (is in monitoring and repetition state) to observe CLS from both the ports, before ARBx is transmitted on the loop. After the arbitration is won and the other port is OPENED, arbitrated loop engine sets ACCESS_GRANTED for the downstream logic. With the reception of ACCESS_GRANTED signal, receive and transmit engines are in OPERATION STATE. |
| Receive Programming | Once NL_Core is set up, the Receive operates on-line. Section 4.1, "Core Setup" describes NL_Core setup. FIGS. 10A–10C show the Receive operating algorithm. As described by FCS, the receive engine asserts synchronization_acquired, after receiving the three consecutive valid words. Then link initialization protocol is followed. At the successful completion of Link Initialization Protocol, the NL_Port is in active state, and it expects idle, R_RDY, or SOF delimiter for a frame. If the port receives primitive sequence, then it exists active state and enters one of the link states. When SOF is detected, the frame is steered on the basis of steering mechanism programmed (refer to CTRL_REG). Sequence validity is checked, if CTRL_REG is asserted. Base address for each frame is computed, if the offset is used (CTRL_REG), and the WRITE_BAR is performed prior to receiving the first frame of a sequence. |
| Functional Waveforms | FIG. 11A shows the reception of class 1 frames, when steering_unmodified is selected. FD_TYPE provides the frame data type, CL_TYPE provides class of service, FRAME_STATUS provides the frame parsing tags, SOF and EOF are also provided by the Receive Engine. All these signals may be used for custom steering implementation. Similarly, FIG. 11B shows the reception of class 2/3 frames, when steering_unmodified is selected. FIG. 11C shows the reception of class 2/3 data frames, when steering_header_class is selected. The header is steered to hbb_buffer, and the payload data to pl_buffer. FIG. 11D shows the reception of class 1 data frames, when steering_header_class is selected. The header is steered to hc1_buffer, and the payload data to pl_buffer. |
| Word Synchronization | FIG. 12 shows the Receive Word Synchronization State Machine diagram. The tables below describe the Receive states and show the Receive state transition conditions. A transmission character is any encoded character (valid or invalid) transmitted across a physical interface specified by FC-0. Valid Transmission Characters are specified by the Transmission Code and include Data and Special Characters. A transmission word is a string of four contiguous Transmission Characters occurring on boundaries that are zero modulo four from a previously received Primitive Sequence. An ordered set is a transmission word composed of a K28.5 Character in its first byte followed by three Data Characters. When three valid ordered sets are received, the word synchronization is achieved. This state is A in FIG. 12. |

| | | |
|---|---|---|
| Receive State Descriptions | State | Description (Detection State) |
| | A | No Invalid Transmission Word |
| | B | First Invalid Transmission Word |
| | C | Second Invalid Transmission Word |
| | D | Third Invalid Transmission Word |
| | E | Fourth Invalid Transmission Word (Loss of Synchronization) |
| | F | Reset |

| | | |
|---|---|---|
| Receive State Transition Conditions | State Transition | Transition Condition |
| | a | The first invalid transmission word is detected |
| | b | An additional invalid transmission word is not detected in the |

Figure 13A:
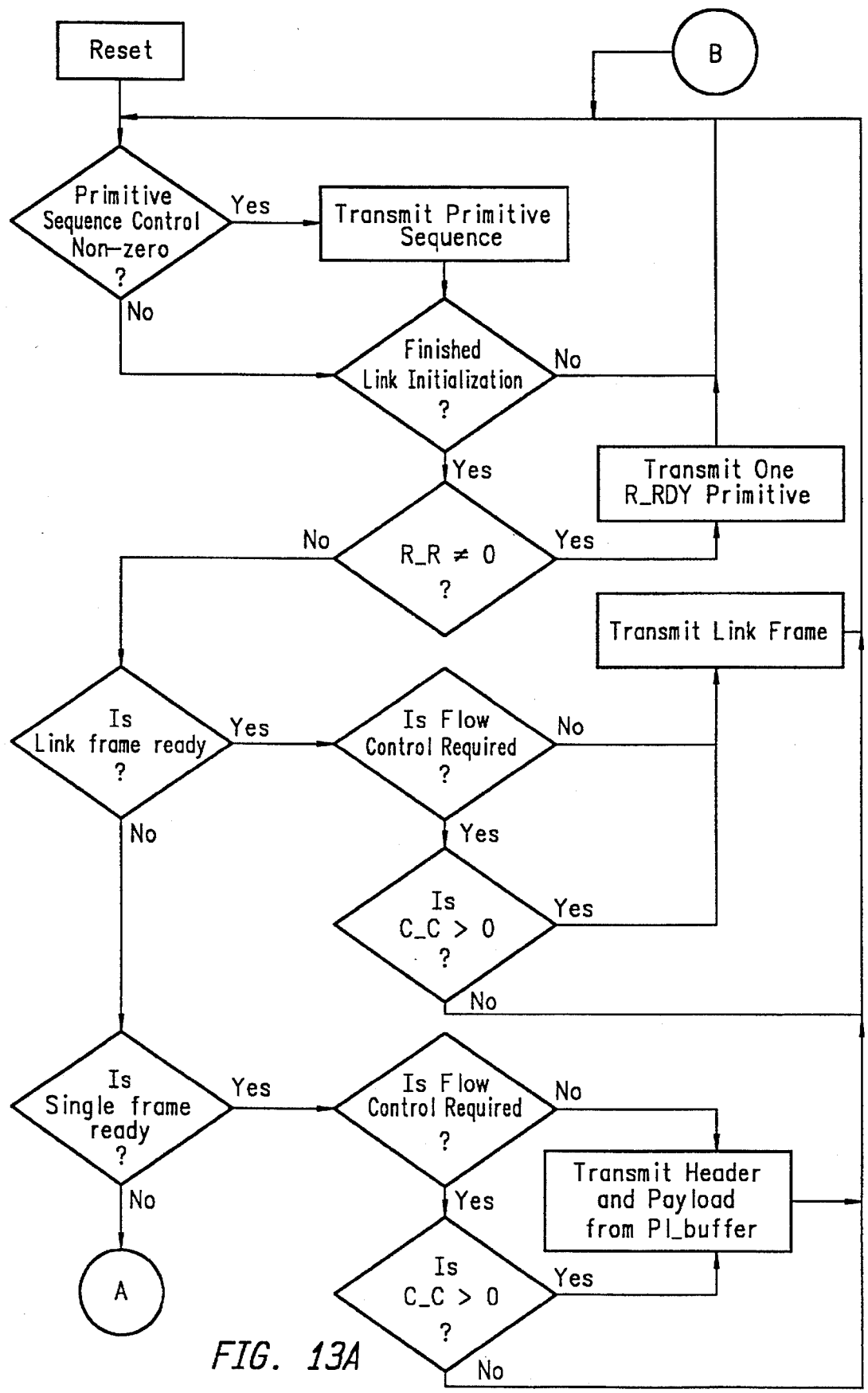
FIGS. 13A–13B are flow diagrams of a transmit operation.
Figure 13B:
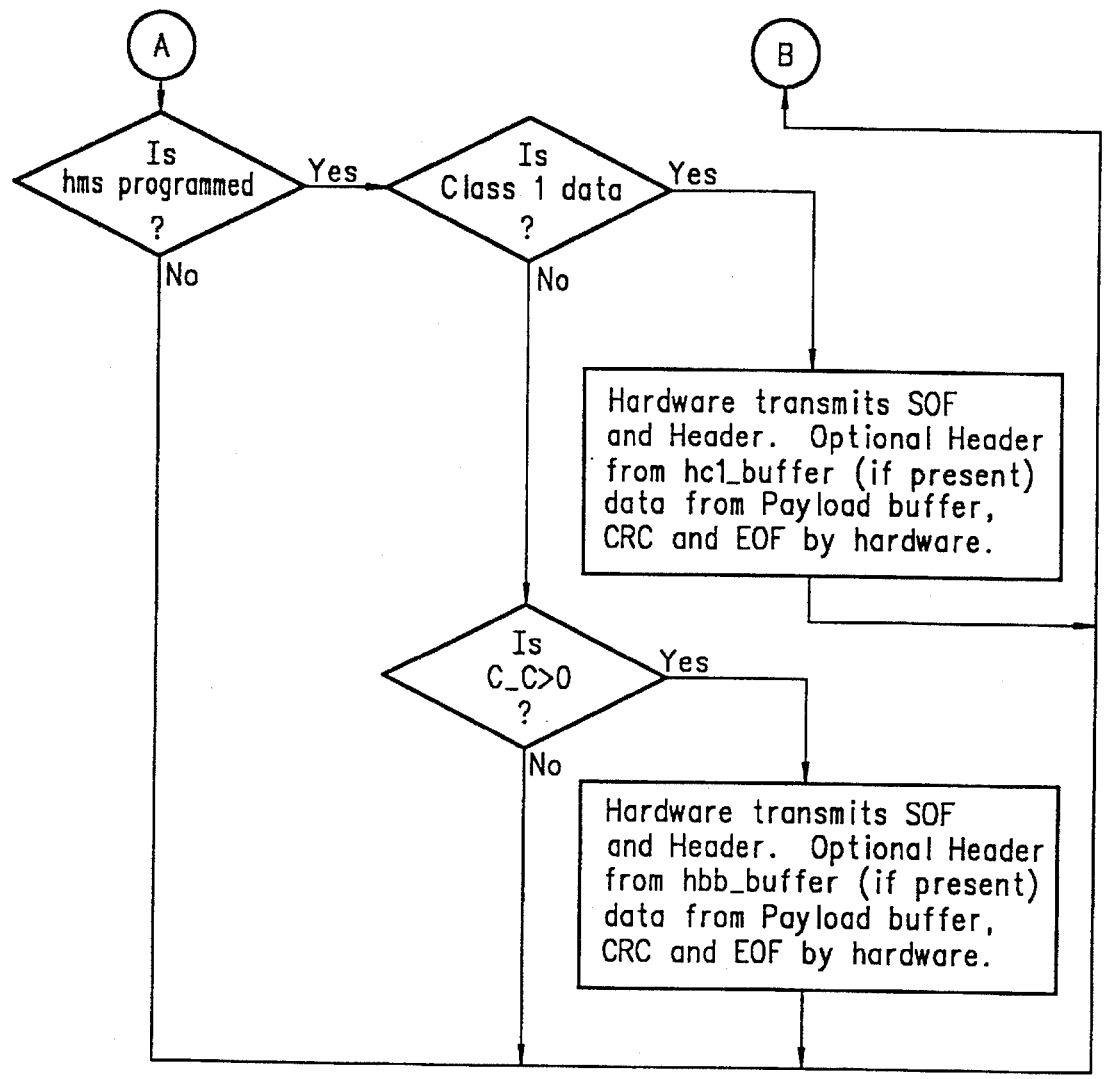
Figure 14A:
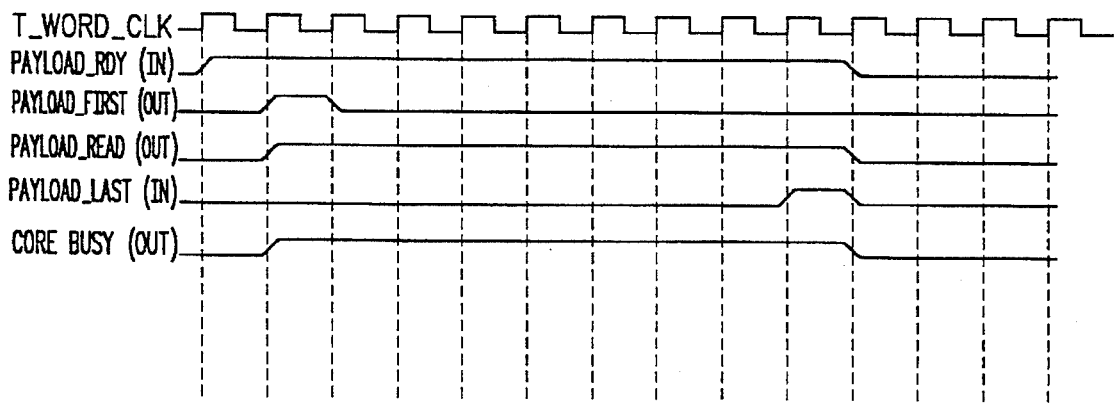
Figure 14B:
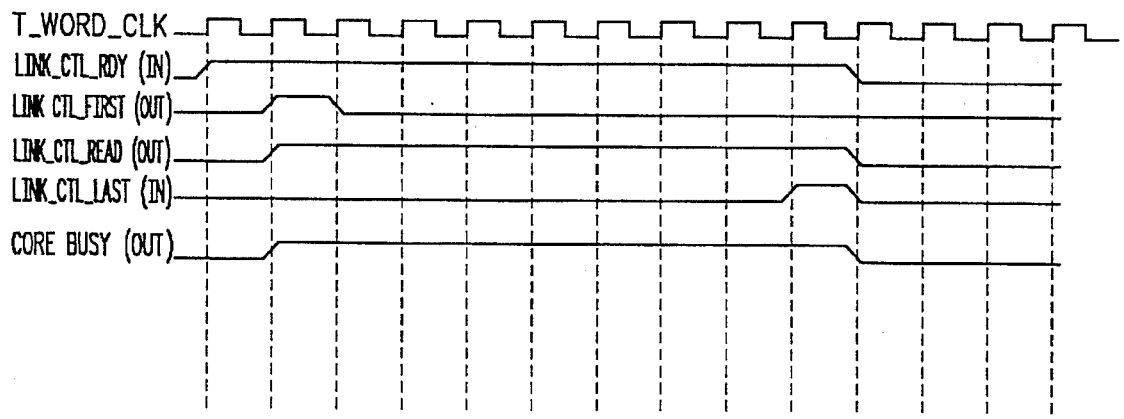

| | | |
|---|---|---|
| | | next two or fewer consecutive transmission words |
| | c | An additional invalid transmission word is detected in the next two or fewer consecutive transmission words |
| | d | The receiver detects three ordered sets, not necessarily consecutive, without any intervening error conditions |
| | e | The receiver is reset |
| | f | The receiver exits a previously established reset condition |
| | g | Loss of signal |
| Transmit Programming | | Following is a description of how to use the Transmit. FIGS. 13A–13B show the Transmit operating algorithm. At the successful completion of Link Initialization Protocol, the NL_Port is in active state, and the transmit is on-line. If there are any outstanding R_RDYs to be sent (R_R counter value is not equal to zero), R_RDY preceded and followed by two idle primitive signals will be transmitted. Of the multiple frame sources, link frames have the highest priority, therefore, if a link frame is ready to be transmitted, then transmit engine sends link frame first. All the single data frames are expected from the generic path that is pl_buffer or Data_FIFO (transmit). The hardware managed sequence for class 1 service uses hardware to transmit SOF and header, hc1_buffer to transmit optional headers (if present), pl_buffer to transmit payload data, and hardware to transmit CRC and EOF. For class 2/3 HMS transmit, there are two basic differences, one is transmit engine reads optional header (if present) from hbb_buffer, and the second difference is that the transmit checks the C_C counter value to ensure the remote receiver is ready. BBFLO flow control rules are applied to Class 1 SOFc and all Class 2 and 3 frame transmissions. |
| Functional Waveforms | | FIG. 14A shows the functional waveforms to transmit a single frame. The frame is read off the payload buffer. FIG. 14B shows the functional waveform of transmitting a link frame. This path is used for transmitting ACK and other link control frames. |

Figure 14C:
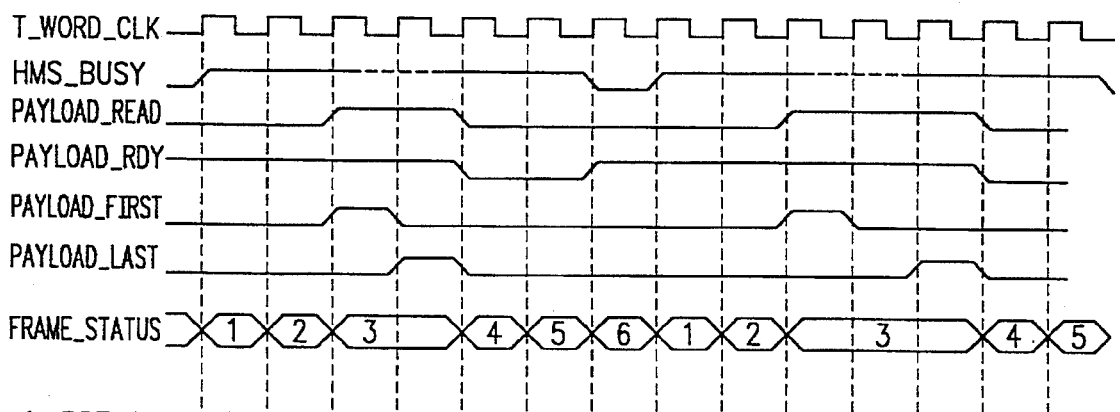

FIG. 14C shows the transmission of HMS frame when optional headers are present. For this frame, header is prepared by hardware, optional headers are read from hcl_buffer or hbb_buffer, payload are read from pl_buffer, CRC and EOF are prepared by hardware. FIG. 14D shows back to back frame transmission of HMS, when optional headers are not present.

Figure 15:
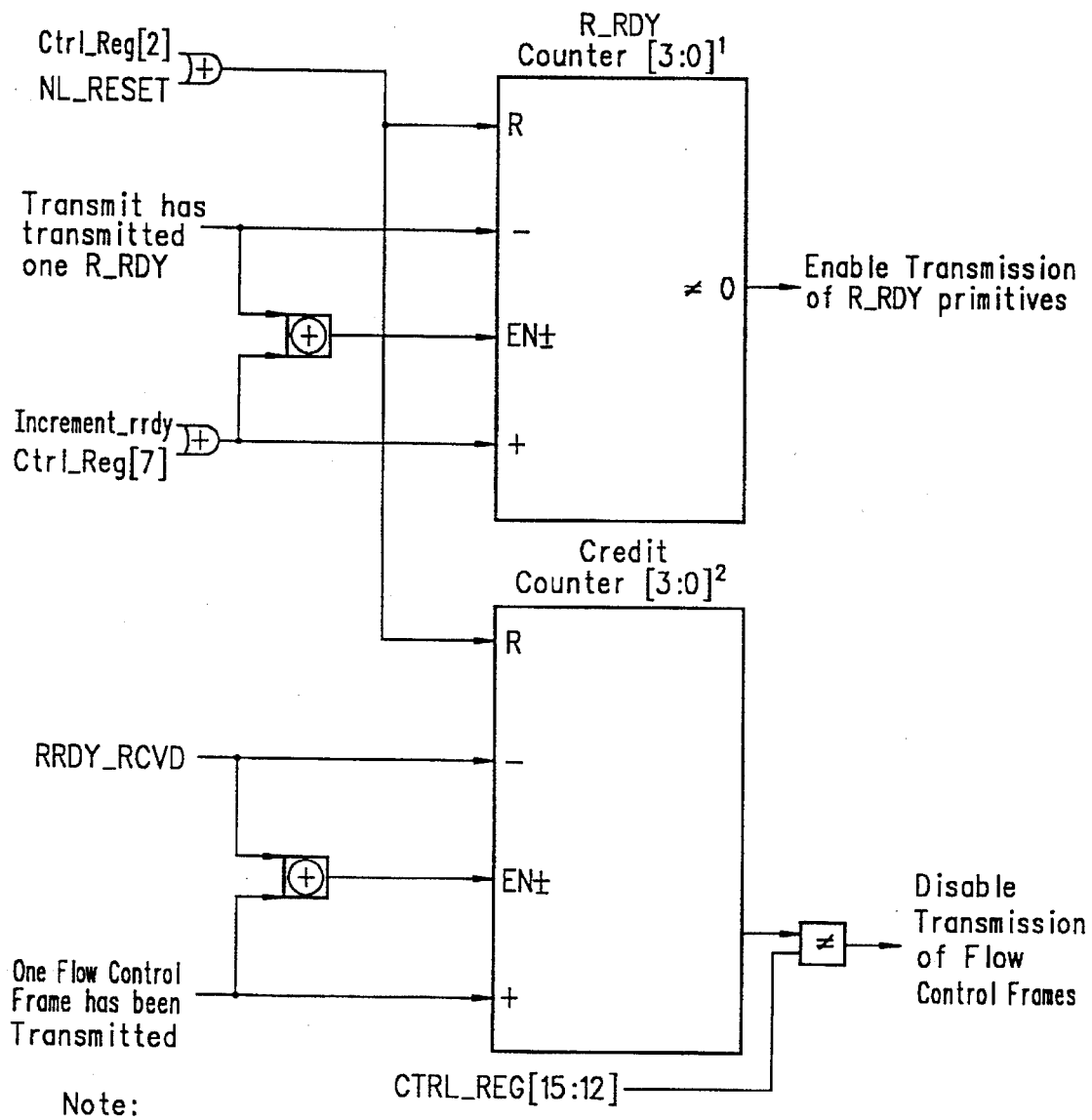
FIG. 15 is a functional block diagram illustrating the flow control mechanism.
Figure 16:
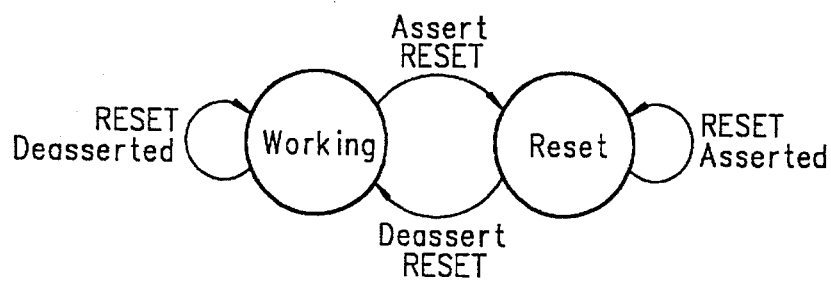
FIG. 16 illustrates a transmit state diagram.

| | |
|---|---|
| BB Flow Control | FIG. 15 shows the R_RDY flow control mechanism. Initial credit count (C_C counter) and R_RDY buffer count (R_R counter) are loaded by the credit counts determined during login. When ever a BB Flow frame is transmitted, C_C counter is decremented and R_RDY received C_C counter is incremented. When the local buffer is released, Increment R_RDY signal is received, which in turn increments R_R counter. When an R_RDY is transmitted, the R_R counter is decremented. R_RDY primitives are preceded and followed by a minimum of two IDLEs. All frames are separated by a minimum of six primitive signals. |
| Transmit State Diagram | Transmit always in working state or reset state, as described in FCS. In working state, transmit may be in Link initialization state (one of the link states NOS, OLS, LR, LRR), primitive signal state (transmitting idle or R_RDY), or frame_transmit state. |
| Transmitting a Single FCS Frame | To transmit a single frame, write the frame in entirety to pl_buffer and assert pl_rdy signal. When Transmit asserts pl_read_first and pl_read, for each T_WORD_CLK negative to positive going edge one word is read from the payload buffer. External logic asserts pl_last for the last data word of the frame, then pl_read is deasserted by transmit engine. CRC is generated by hardware and transmitted preceding the EOF delimiter. |
| Transmitting a Hardware-Managed Sequence | The Hardware Managed Sequence (HMS) Frame Header Mechanism contains the bytes for the SOF, FHDR and (optionally) OHDR fields. If OHDRs are not used, the Transmit prepares the header and transmits. For the first frame of HMS, the header is read from buffer, and it is stored in the h_wd0_reg to h_wd6_reg. For subsequent intermediate frames these registers are used to transmit frame header. For the last frame of sequence, header words storage registers and hms_ctl register are used to transmit frame header. If OHDRs are used, the Transmit sends the header and optional header is read out of header buffer (either HC1 for class 1 sequence, HBB for class 2/3 data frames). The FHDR DF_CTL field indicates which optional headers are in use. The HMS header should only be programmed with SOFi1, SOFn1, SOFi2, SOFn2, SOFi3 and SOFn3 codes with FHDR R_CTL[31:28] = 0xxx$_2$ (Device Data or Video Data frames). If the HMS header is programmed for Class 2 or 3, the HMS must be programmed so that frames are not generated longer than the minimum of either the BBFLO buffer size in the fabric or in the destination link receiver. To transmit a Hardware-Managed Sequence, write the header of the first frame to hbb_buffer if class 2/3 service is used or to hc1_buffer if class 1 |

Figure 18:
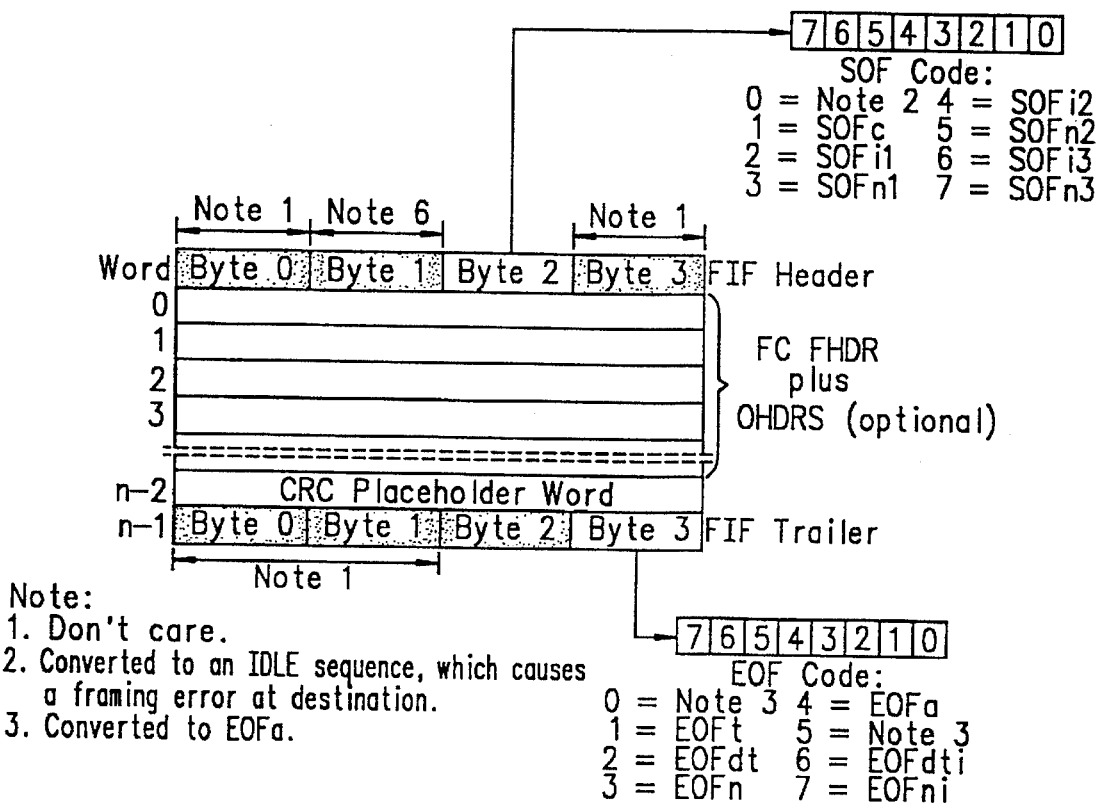
FIG. 18 illustrates a transmit frame interface format.

| | |
|---|---|
| | service is used. Program hms_ctl register. Write hms_seq_cnt register if the sequence count (SEQ_CNT) of the first frame of the sequence is other than zero or not equal to the last frame SEQ_CNT +1 of the previous hardware managed sequence.<br>For class 2/3 service, maximum payload size during the login has to be programmed.<br>When the Transmit is ready to begin transmitting, it asserts HC1_RD to read from HC1 buffer, HBB_RD to read from HBB buffer, PL_RD to read from the payload buffer, and LINK_CTL_RD for link frames. The Transmit now expects data to be available on the next clock cycle and every The Transmit increments the Sequence Count automatically and inserts the value into the frame header. |
| Transmitting a Primitive Sequence | To transmit a Primitive Sequence, first set the appropriate Transmit Primitive Transmission Control signals, CTRL_REG[5:0].<br>The Transmit engine begins transmitting the Primitive Sequence as soon as it has completed any frame transmission already in progress.<br>The Transmit continues to transmit the Primitive Sequence until CTRL_REG[5:10] is reset to $000000_2$. |
| Transmitting an R_RDY Primitive Ordered Set | Asserting INCREMENT_RRDY increments the number of outstanding R_RDY's to be transmitted. R_RDY primitives are preceded and followed by a minimum of two IDLEs. |
| Frame Interface Formats (FIF) | The following sections describe the frame interface formats used in NL_Core. Frame interface formats can be selected or deselected using control bits. |
| Receive FIF | In a receive, SOF and EOF are compacted into single bytes, freeing room for other data used to delineate and control the frame.<br>FIG. 17 illustrates the Receive FIF. The Receive engine converts data from FCS Format to FIF as it writes the data into either the BBFLO (hbb_buffer) or non-BBFLO (hc1) buffers. |
| Transmit FIF | This format is used for all frames input to the Transmit. It allows a Fibre Channel frame to exist outside the core without the use of 10-bit special characters to delineate frame start and end. SOF and EOF are compacted to single bytes, freeing room for other data used to delineate and to control the frame.<br>FIG. 18 illustrates the Transmit FIF. The Transmit coverts data from FIF to FCS format prior to transmitting. |

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A node loop port core for use in a high speed data system such as Fibre Channel for encoding, decoding and error control of transmitted data, said node loop port core comprising:

a decode unit for receiving and decoding data including converting data width with error checking and constructing parity protected words from halfwords and bytes, an encode unit for encoding data for transmission including converting data width and generating encoded halfwords or bytes after checking parity, a receive unit coupled with said decode unit for forwarding data to a host interface after frame parsing, frame steering and error checking, a transmit unit coupled with said encode unit for frame construction, CRC generation, Fibre Channel primitive signal and sequence generation, and an arbitrated loop coupled to said decode unit, said encode unit, said receive unit, and said transmit unit, said arbitrated loop unit performing all arbitration functions including recognition of primitive signals and sequences pertinent to said loop, said arbitrated loop including:

a loop state machine for performing loop initialization protocol, loop arbitration and loop fairness in accordance with Fibre Channel specifications, a first multiplexer controlled by said loop state machine for receiving and transmitting decoded data from said decode unit, a second multiplexer controlled by said loop state machine for receiving and transmitting data from said transmit unit for port to port communication, and a loop buffer connected with said loop state machine for receiving and retiming received words.

2. The node loop port core as defined by claim 1 wherein said decode unit includes:

a 20 bit input for use when a 20 bit mode is enabled, a 10 bit input for use when a 10 bit mode is enabled, a 10 bit decoder coupled to said inputs and including two parallel 10 bit to 8 bit decoders with error checking, a parity generator coupled to said decoder for receiving decoded data and generating and appending odd parity, a word assembler coupled to said parity generator for assembling 32 bit parity protected data for said arbitrated loop, and a receive word controller for receiving control signals and generating status signals and controlling operations in said decode unit.

3. The node loop port core as defined by claim 1 wherein said encode unit includes:

a 20 bit output for use when a 20 bit mode is enabled, a 10 bit output for use when a 10 bit mode is enabled, an 8 bit encoder coupled to said outputs and including two parallel 8 bit to 10 bit encoders, a parity checker coupled to said encoder and checking off parity and stripping a parity bit, a word disassembler coupled to said parity checker for disassembling 32 bit parity protected data into 16 bit parity protected data for said parity checker and encoder, and a transmit word controller for receiving control signals and generating status signals and controlling operations in said encode unit.

4. The node loop port core as defined by claim 1 wherein said receive unit includes:

a detect ordered set unit for receiving decoded words from said decode unit and detecting primitive signals, primitive sequences, and frame delimiters, a receive pipeline for recovery decoded words from said decode unit, a CRC unit for generating CRC bits for incoming frames from said receive pipeline and checking for correct CRC bits, a multiplexer for recovering data from said receive pipeline for transmission downstream, a steering control unit for providing logic signals for frame parsing and steering, a frame interface formats (FIF) converter for converting Fibre Channel Standard format to FIF format, a frame control unit for providing frame parsing information for use in custom steering, a base address register for providing a base address for vectoring frames to a memory, and a receive control unit coupled to and controlling all other units of said receive unit, and providing all required status signals to downstream logic.

5. The node loop port core as defined by claim 1 wherein said transmit unit includes a header multiplexer for multiplexing frame headers from multiple sources, a frame data multiplexer unit connected to said header multiplexer and receiving payload and link inputs and multiplexing data and headers of frames, a CRC generate unit connected to receive outputs from said frame data multiplexer and generating a CRC for frames, an output multiplexer connected to receive outputs from said CRC generate unit and including data paths for header and data, for start of frame SOF and end of frame EOF delimiters, and CRC, said output multiplexer presenting transmission words to said encoder through said arbitrated loop, a hardware sequencing parameters and registers unit for providing necessary parameters for hardware managed sequences to said header multiplexer, a unit for performing primitive signal, sequence, and delimiter generation, a flow control unit for hardware managed flow control and responsive to a R_RDY (receive unit ready) signals from a remote link receiver, and a transmit control unit interconnected with and controlling all units in a transmit operation including single frames from said frame data multiplexer unit, sequences of frames in a hardware managed sequencing, idles and primitive sequences, buffer to buffer flow control, frame delimiter generation, offset generation, and CRC generation and transmission for end of frame transmission.

6. A node loop port core for use in a high speed data system such as Fibre Channel for encoding, decoding and error control of transmitted data, said node loop port core comprising:

a) a decode unit for receiving and decoding data including converting data width with error checking and constricting parity protected words from halfwords and bytes, said decode unit including:

a 20 bit input for use when a 20 bit mode is enabled, a 10 bit input for use when a 10 bit mode is enabled, a 10 bit decoder coupled to said inputs and including two parallel 10 bit to 8 bit decoders with error checking, a parity generator coupled to said decoder for receiving decoded data and generating and appending odd parity, a word assembler coupled to said parity generator for assembling 32 bit parity protected data for said arbitrated loop, and a receive word controller for receiving control signals and generating control signals and controlling operations in said decode unit;

b) an encode unit for encoding data for transmission including converting data width and generating encoded half-words or bytes after checking parity, said encode unit including:

a 20 bit output for use when a 20 bit mode is enabled, a 10 bit output for use when a 10 bit mode is enabled, an 8 bit encoder coupled to said outputs and including two parallel 8 bit to 10 bit encoders, a parity checker coupled to said encoder and checking off parity and stripping a parity bit, a word disassembler coupled to said parity checker for disassembling 32 bit parity protected data into 16 bit parity protected data for said parity checker and encoder, and a transmit word controller for receiving control signals and generating status signals and controlling operations in said encode unit;

c) a receive unit coupled with said decode unit for forwarding data to a host interface after frame parsing, frame slicing, error checking, said receive unit including:

a detect ordered set unit for receiving decoded words from said decode unit and detecting primitive signals, primitive sequences, and frame delimiters, a receive pipeline for recovery decoded words from said decode unit, a CRC unit for generating CRC bits for incoming frames from said receive pipeline and checking for correct CRC bits, a multiplexer for recovering data from said receive pipeline for transmission downstream, a steering control unit for providing logic signals for frame parsing and steering, a frame interface formats (FIF) converter for converting Fibre Channel Standard format to FIF format, a frame control unit for providing frame parsing information for use in custom steering, a base address register for providing a base address for vectoring frames to a memory, and a receive control unit coupled to and controlling all other units of said receive unit, and providing all required status signals to downstream logic;

d) a transmit unit coupled with said encode unit for frame construction, CRC generation, Fibre Channel primitive signal and sequence generation, said transmit unit including:

a header multiplexer for multiplexing frame headers from multiple sources, a frame data multiplexer unit connected to said header multiplexer and receiving payload and link inputs and multiplexing data and headers of frames, a CRC generate unit connected to receive outputs from said frame data multiplexer and generating a CRC for frames, an output multiplexer connected to receive outputs from said CRC generate unit and including data paths for header and data, for start of frame SOF and end of frame EOF delimiters, and CRC, said output multiplexer presenting transmission words to said encoder through said arbitrated loop, a hardware sequencing parameters and registers unit for providing necessary parameters for hardware managed sequences to said header multiplexer, a unit for performing primitive signal, sequence, and delimiter generation, a flow control unit for hardware managed flow control and responsive to a R_RDY (receive unit ready) signals from a remote link receiver, and a transmit control unit interconnected with and controlling all units in a transmit operation including single frames from said frame data multiplexer unit, sequences of frames in a hardware managed sequencing, idles and primitive sequences, buffer to buffer flow control, frame delimiter generation, offset generation, and CRC generation and transmission for end of frame transmission;

e) an arbitrated loop coupled to said decode unit, said encode unit, said receive unit, and said transmit unit, said arbitrated loop unit performing all arbitration functions including recognition of primitive signals and sequences pertinent to said loop, said arbitrated loop including:

a loop state machine for performing loop initialization protocol, loop arbitration and loop fairness in accordance with Fibre Channel specifications, a first multiplexer controlled by said loop state machine for receiving and transmitting decoded data from said decode unit, a second multiplexer controlled by said loop state machine for receiving and transmitting data from said transmit unit for port to port communication, and a loop buffer connected with said loop state machine for receiving all retiming received words.

* * * * *